(12) United States Patent
Pasto

(10) Patent No.: US 11,471,004 B2
(45) Date of Patent: Oct. 18, 2022

(54) SHOWER SHELVING SYSTEM

(71) Applicant: Cris Pasto, Spencer, NY (US)

(72) Inventor: Cris Pasto, Spencer, NY (US)

(*) Notice: Subject to any disclaimer, the term of this patent is extended or adjusted under 35 U.S.C. 154(b) by 0 days.

(21) Appl. No.: 17/184,032

(22) Filed: Feb. 24, 2021

(65) Prior Publication Data
US 2021/0274982 A1 Sep. 9, 2021

Related U.S. Application Data

(60) Provisional application No. 62/985,714, filed on Mar. 5, 2020.

(51) Int. Cl.
*A47K 3/28* (2006.01)
*F16B 12/12* (2006.01)
*A47B 57/20* (2006.01)
*A47B 43/00* (2006.01)

(52) U.S. Cl.
CPC ............ *A47K 3/281* (2013.01); *A47B 43/003* (2013.01); *A47B 57/20* (2013.01); *F16B 12/12* (2013.01)

(58) Field of Classification Search
CPC .......... A47H 1/10; A47H 1/102; A47H 1/104; A47H 1/13; A47H 1/14; A47H 1/142; A47H 1/144; A47K 3/281; A47B 43/003; A47B 57/20; F16B 12/12
USPC ............................................ 211/105.1–105.6
See application file for complete search history.

(56) References Cited

U.S. PATENT DOCUMENTS

| | | | | |
|---|---|---|---|---|
| 1,225,469 A * | 5/1917 | Mistrik | ..................... | A47H 1/13 248/260 |
| 1,373,333 A * | 3/1921 | Kennedy | .................. | A47H 1/13 248/256 |
| 1,561,110 A * | 11/1925 | Reminger | ................ | A47H 1/13 248/272 |
| 2,649,269 A * | 8/1953 | Hart | ....................... | A47H 1/142 248/262 |
| 2,780,365 A * | 2/1957 | Trainor | ................. | D06F 57/122 4/546 |
| 3,353,779 A * | 11/1967 | Baker | ..................... | A47K 10/10 248/251 |
| 3,521,758 A * | 7/1970 | Guilfoyle, Sr. | ......... | F16B 9/054 248/200.1 |
| 3,795,380 A * | 3/1974 | Turner | ..................... | A47H 1/10 248/222.51 |
| 3,891,091 A * | 6/1975 | Anderson | ............... | A47H 1/144 211/105.3 |
| 4,192,426 A * | 3/1980 | Gauthier | ................ | A47K 3/001 211/105.4 |
| 4,360,109 A * | 11/1982 | Kurtz | ..................... | D06F 57/12 211/100 |
| 5,192,427 A * | 3/1993 | Eger | ........................ | E03C 1/046 210/232 |
| 5,255,401 A * | 10/1993 | Sambrookes | .......... | A47K 3/281 211/112 |
| 5,332,108 A * | 7/1994 | Blass | ................... | A47B 96/067 211/90.02 |
| 6,431,386 B1 * | 8/2002 | Hofman | ................. | A47K 3/281 220/840 |
| 6,575,315 B2 * | 6/2003 | Zidek | ........................ | A47F 5/06 211/90.03 |

(Continued)

*Primary Examiner* — Patrick D Hawn
(74) *Attorney, Agent, or Firm* — Brown & Michaels, PC

(57) ABSTRACT

A shower system having individual shower brackets containing recesses and slots for receiving cylindrical rods and shelves. The shower system being directed to an improved apparatus for storage.

27 Claims, 23 Drawing Sheets

(56) References Cited

U.S. PATENT DOCUMENTS

| | | | |
|---|---|---|---|
| 8,051,781 B1 * | 11/2011 | Vind | A47K 3/38 |
| | | | 211/105.6 |
| 8,474,632 B2 | 7/2013 | Yang et al. | |
| 10,149,540 B2 * | 12/2018 | Corless | A47B 96/067 |
| 2007/0193970 A1 * | 8/2007 | Carington | A47G 25/06 |
| | | | 211/105.1 |

* cited by examiner

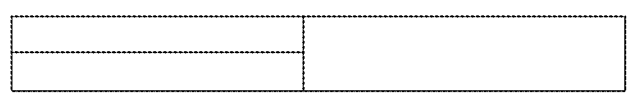
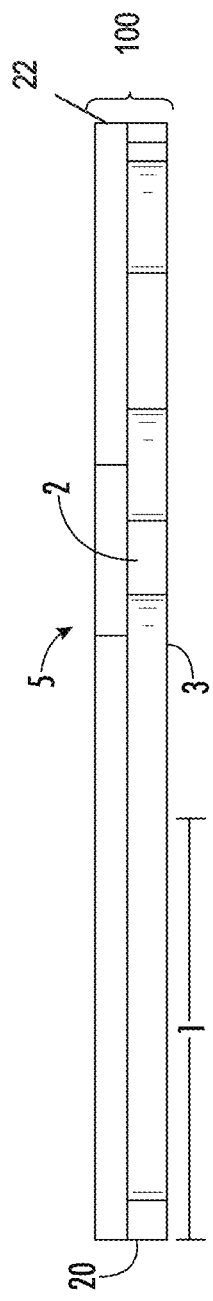
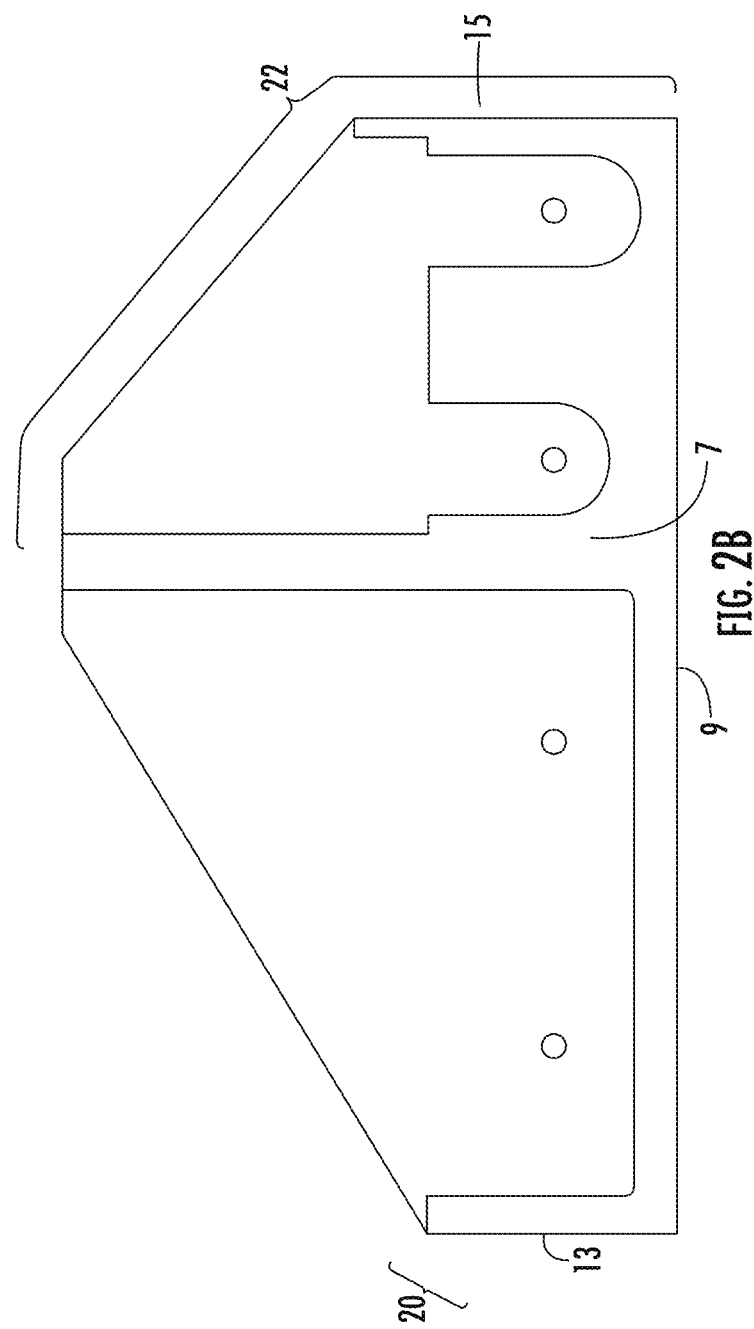

SHOWER SHELVING SYSTEM

REFERENCE TO RELATED APPLICATIONS

This application claims one or more inventions which were disclosed in Provisional Application No. 62/985,714, filed Mar. 5, 2020, entitled "SHOWER SHELVING SYSTEM". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of storage. More particularly, the invention pertains to a shelving system for use in showers.

Description of Related Art

There are various products available to provide for storage within the bath or shower unit. Conventional shelving units are designed to hang off of the shower head supply arm. The conventional shelving units provide a small storage area and place an unsupportable load on the shower head supply arm that can lead to problematic damage of the wall. Shampoo bottles are often placed on the small storage area of conventional shelving units in a fashion that invariably causes interference with the shower stream and can sometimes cause the shelving unit to slide towards the user in the shower. Other variations of conventional shelving, such as in the tub wall and tub surround integrated shelving, or shelving integrated into the wall, are often narrow and limited in storage capacity. Integrated shelving is often in reach of small children and exposed to the wet environment of the tub without dry storage available.

Conventional shower caddies, a derivation of conventional shelving units, are also designed to hang off of the shower head supply arm and are attached to the wall through suction cups located on the shower caddy. FIGS. 1-2 show a conventional shower system AA and a conventional shower storage system BB. The shower caddy consistently slides down the shower head supply pipe, or is inherently unbalanced such that the shower caddy biases to one side of the shower head supply arm due to the accompanying suction cups that invariably lose adhesive force over time. Conventional shower caddies also lack sufficient storage space that can lead to items on the caddy interfering with the shower stream in a manner that causes the water to spray and cause water damage outside the tub/shower unit.

Conventional curtain rods are adjustable two-piece rods that extend to allow tightening of the rod, through a tension force, between two opposite facing surfaces. Conventional curtain rods cannot sustain the tension force on the two surfaces over time and often slip down or damage the wall. Other conventional curtain rods use conventional brackets mounted to a wall that will only accept one rod in a recess of the bracket. The conventional brackets that support the conventional curtain rods are typically dedicated to supporting one or more shower curtain rods and lack the capacity to support any additional shelving.

U.S. Pat. No. 8,474,632, entitled "Shelving System" is a caddy for use in the bathroom, in which the caddy has an elongated tension rod with a telescoping section and an internal biasing elements which has a first end adjacent a first wall of the shower and a second end adjacent the second wall of the shower. Storage accessory units are mounted to the elongated tension rod. Simultaneously maintaining adequate tension perpendicular to two surfaces, which can get wet, while supporting a load across the length of the elongated tension rod is problematic and can result in collapse of the caddy, damage to the wall surface, as well as possible injury to the user during use of the shower.

Conventional shelving systems for the shower do not provide stable storage space with a large capacity or have mounting brackets that enable the bracket to support heavy loads.

SUMMARY OF THE INVENTION

The present invention is directed to a shelving system that provides stable storage space in the shower, has a large storage capacity, and is securely fastened to a wall to support heavy loads. A shelving system of an embodiment of the present invention comprises a shower bracket comprising a plate having a front face, a back face, and shaped to have an outer perimeter with a bottom surface. The bracket has a first side, at a first end, perpendicular to the bottom surface, a second side, at a second end opposite the first side, perpendicular to the bottom surface, and a top surface connected to the first side and the second side. The shower bracket of the shelving system also has a sectioner mounted to the front face of the plate. The sectioner has a bottom wall, with an outer surface, aligned with the bottom perimeter of the plate connected to the first side wall, having a surface, aligned with the first side of the outer perimeter, a second side wall, having a surface, connected to the bottom perimeter of the plate, opposite the first side wall, and aligned with the second side of the perimeter of the plate. The bottom wall extends longitudinally from the first end to the second end of the plate. The sectioner, extending out of the bottom wall, is a radially extending divider wall. A first recess is defined by the front face of the plate, the bottom wall of the sectioner, the first side wall of the sectioner and the radially extending divider. A second recess is defined by the front face of the plate, the bottom wall of the sectioner, the second side wall. A radially extending divider wall, adjacent to a truncated radially extending divider wall, extends from the bottom wall of the sectioner to further define the second recess into a first u-shaped slot and a second u-shaped slot. The first u-shaped slot is defined by the radially extending divider wall and the truncated radially extending divider wall and the second u-shaped slot is defined by the second wall of the sectioner and the truncated divider wall.

In an embodiment, the present invention comprises wet and dry storage shelving separated by a vapor barrier or a shower curtain. In this embodiment the wet shelf, located above and proximate to one side of the vapor barrier, or shower curtain, is positioned such that the water drains from items placed on the wet shelf. The wet shelf is preferably perforated, or wire formed, to drain to the same side of shower curtain and into tub or shower base. The dry storage area with a shelf, and/or one or more cylindrical rods, is located on the opposite side of the vapor barrier or shower curtain.

Some of the advantages associated with the embodiments of the present invention are the ease of installation, simplicity of design, the convenience of multiple rods (curtain, towel, etc.), and independence with regard to changing individual components with minimal encumbrance or cleaning individual components as most items can be independently detached. Moreover, embodiments of the present invention provide new storage comprising a drainable wet shelf, the aesthetic features of a dry shelf, and a drop shelf, having a rod retaining clip that prevents rod dislodgment, attachable to the wet shelf. The wet shelf wire rack enables a user to apply clothing hangers, or other hooked devices, to suspend items inside the vapor barrier or the shower curtain.

BRIEF DESCRIPTION OF THE DRAWING

These and other features, aspects, and advantages of the present invention will become better understood with regard to the following description, appended claims, and accompanying drawings where:

FIG. 2A shows a top view of a first embodiment of a shower bracket.

FIG. 2B shows a front view of the first embodiment of a shower bracket.

FIG. 2C shows a side view of the first embodiment of a shower bracket.

DETAILED DESCRIPTION OF THE INVENTION

Figure 1:
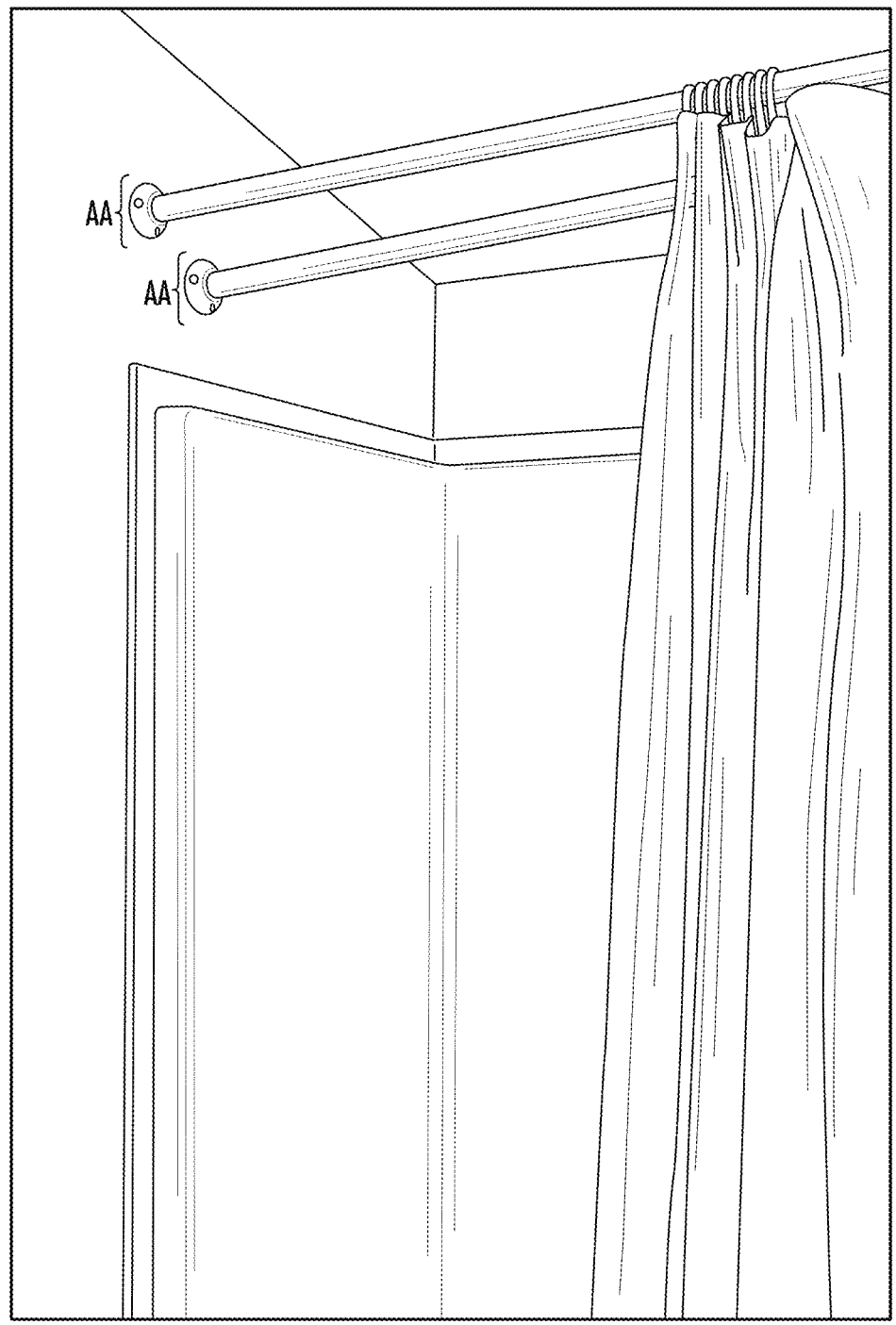
FIG. 1 shows a conventional shower system.
Figure 1A:
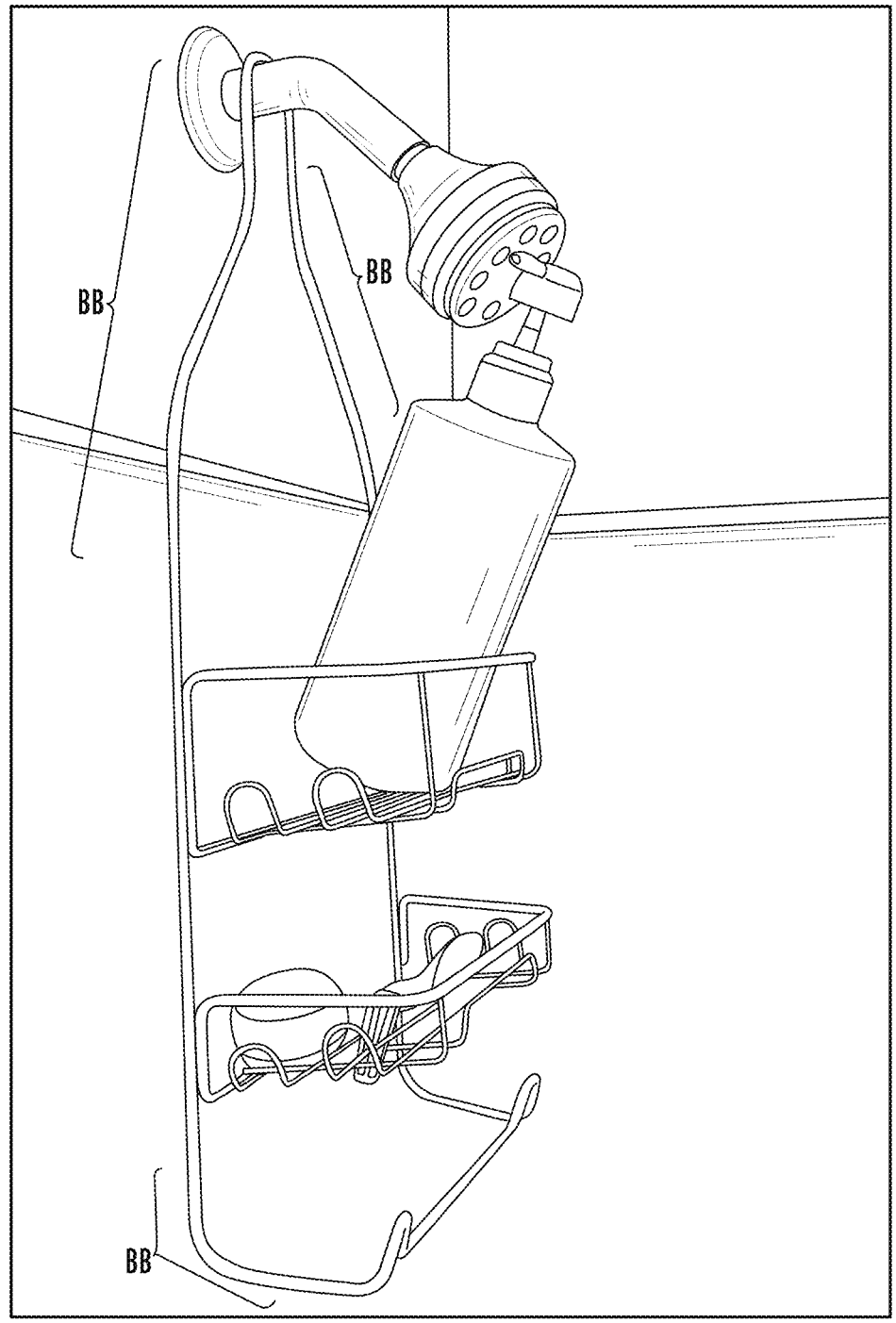
FIG. 1A shows a conventional shower storage system.
Figure 3:
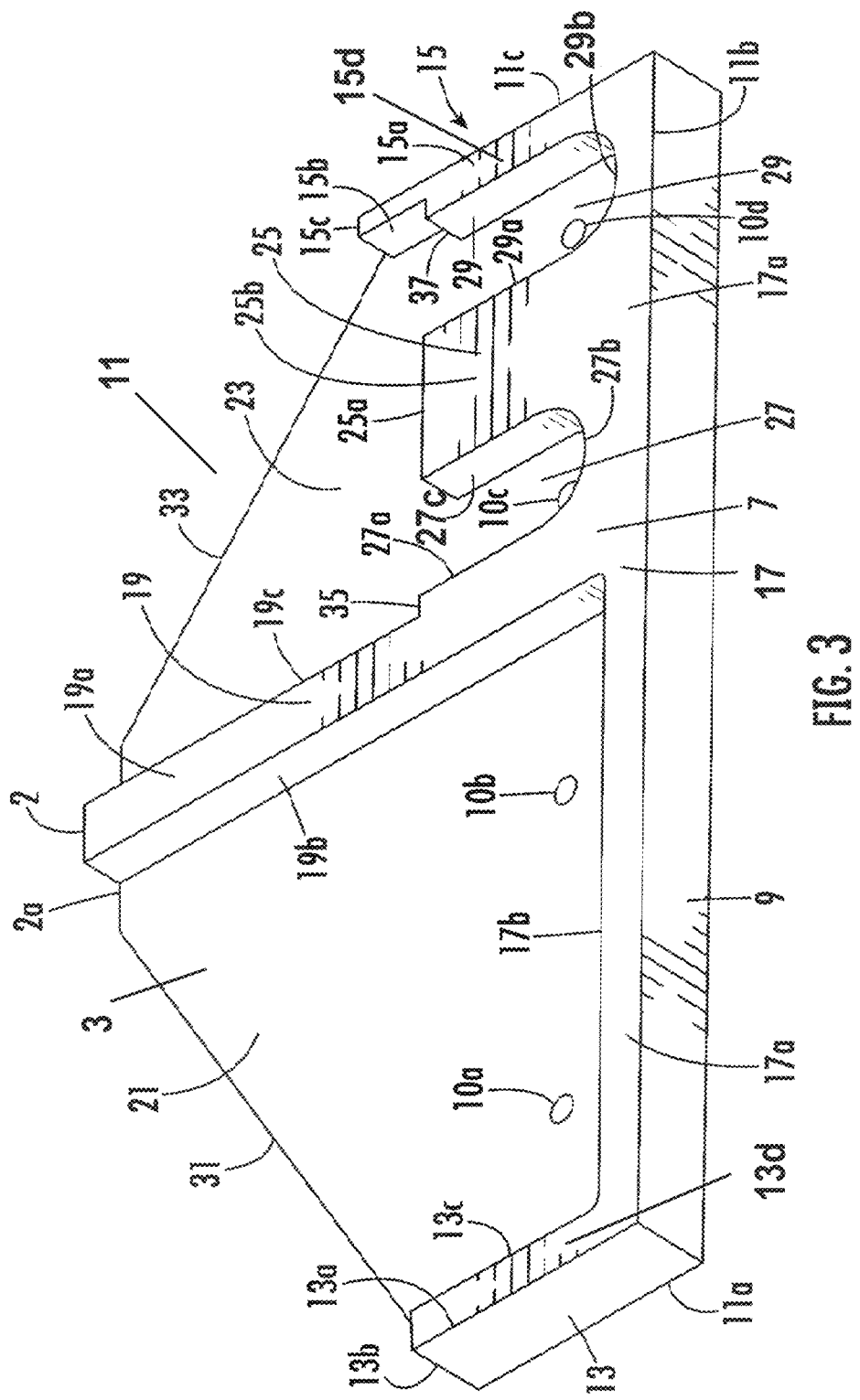
FIG. 3 shows a perspective view of the first embodiment of a shower bracket.
Figure 4:
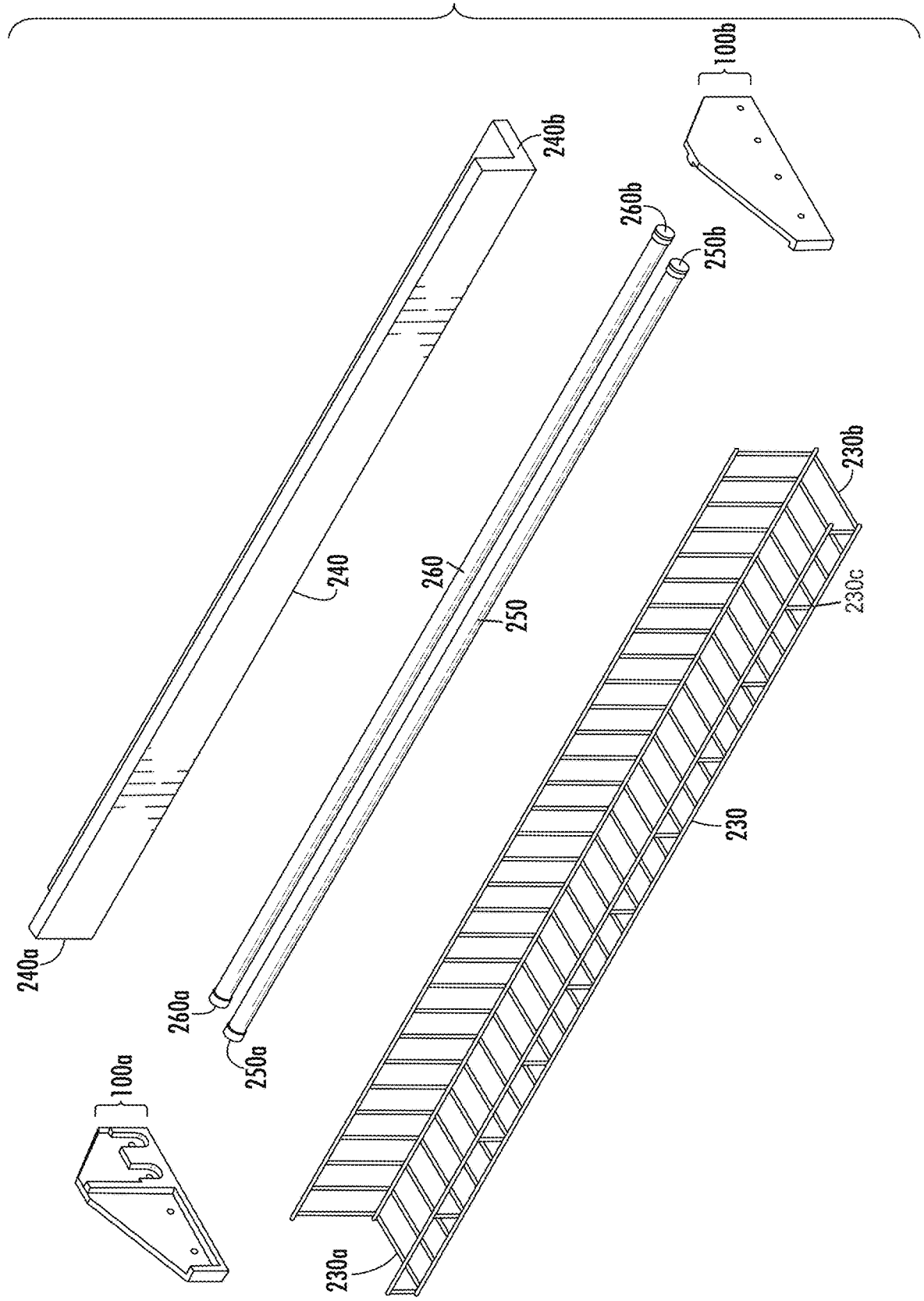
FIG. 4 shows an exploded view of a first embodiment of the shower system.

In the Summary of the Invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

The present invention and alternative embodiments provide for a solution to bath/shower stall storage, accessibility, and organization needs while helping to keep the water within the bath/shower stall to prevent water damage.

FIGS. 2A, 2B, 2C, and 3 show a bracket of a first embodiment of the present invention.

In an embodiment, the shower bracket 100 comprises a plate 1 having a front face 3, a back face 5, and shaped to have a perimeter 11 with a bottom surface 9, a first side surface 11*a*, at a first end 20 perpendicular to the bottom surface 9, a second side surface 11*c* at a second end 22 opposite the first side surface 11*a*, perpendicular to the bottom surface 9, and a top surface 2 connected to the first side surface 11*a* and the second side surface 11*c*. Between the first side surface 11*a* and the top surface 2 is a first diagonal top portion 31 and between the second side surface 11*c* and the top surface 2 is a second diagonal top portion 33. The top surface 2 can include a middle flat top portion 2*a* connected to the first diagonal top portion 31 and the second diagonal top portion 33.

A sectioner 7 is mounted to the front face 3 of the plate 1 with the sectioner 7 having a bottom wall 17, aligned with the bottom surface 9 of the plate 1. The sectioner 7 includes a first side wall 13 having an outer surface 13*a*, a top outer surface 13*b*, an inner surface 13*c*, and an exposed outer face 13*d*, and a second side wall 15, opposite the first side wall 13, having an outer surface 15*a*, an inner wall 15*b*, and top outer surface 15*c*, and an exposed outer face 15*d*. The bottom wall 17 of the sectioner 7 including an inner wall 17*b*, an exposed outer surface 17*a*, and the bottom wall 17 extends longitudinally from the first end 20 to the second end 22 of the plate 1. The first side surface 11*a* has an exposed outer surface 13*a* and the second side surface 11*b* has an exposed outer surface 15*a*. Extending from the inner wall 17*b* of bottom wall 17 of the sectioner 7 is a radially extending divider wall 19 which has an exposed surface 19*a*.

In this embodiment a first recess 21 is defined by the front face 3 of the plate 1, the bottom wall 17 of the sectioner 7, the inner surface 13*c* of the first side wall 13 of the sectioner 7 and a first inner surface 19*b* of the radially extending divider wall 19. A second recess 23 is defined by the front face 3 of the plate 1, the bottom wall 17 of the sectioner 7, the inner side wall 15*b* of the second side wall 15, a second inner surface 19*c* of the radially extending divider wall 19 and a truncated radially extending divider wall 25, extending radially from the bottom wall 17 of the sectioner 7 to further define the second recess 23 into a first u-shaped slot 27 and a second u-shaped slot 29. The truncated radially extending divider wall 25 has an exposed outer surface 25*b*. The first u-shaped slot 27 is defined by the radially extending divider wall 19 and the truncated radially extending divider wall 25, and the second u-shaped slot 29 is defined by the second side wall 15 of the sectioner 7 and the truncated divider wall 25.

The shower bracket 100 can have a first retaining shoulder 35 along the length of the second inner surface 19*c* of radially extending divider wall 19. The first retaining shoulder 35 projects from the second inner wall 19*c* and is connected to an inner wall 27*a* of the first u-shaped slot 27. The first u-shaped slot 27 is defined by the inner wall 27*a*, a rounded wall 27*b* and an inner wall 27*c* of the truncated radially extending divider wall 25. The first retaining shoulder 35 is preferably aligned with a flat top surface 25*a* of the truncated radially extending divider wall 25.

A second retaining shoulder 37, opposite and aligned with the first retaining shoulder 35, is perpendicular to the inner wall 15*b* of the second side wall 15. The second retaining shoulder 37 is connected to an inner wall 29*c* of the second u-shaped slot 29. The second u-shaped slot 29 is defined by the inner wall 29*c*, a rounded wall 29*b* and inner wall 29*a* of the truncated radially extending divider wall 25. The second retaining shoulder 37 projects from the second side wall 15 and is also aligned with the truncated radially extending divider wall 25. The first retaining shoulder 35, the second retaining shoulder 37, and the flat top surface 25*a* of the truncated radially extending divider wall 25, are all aligned along the same plane with each other.

Figure 5:
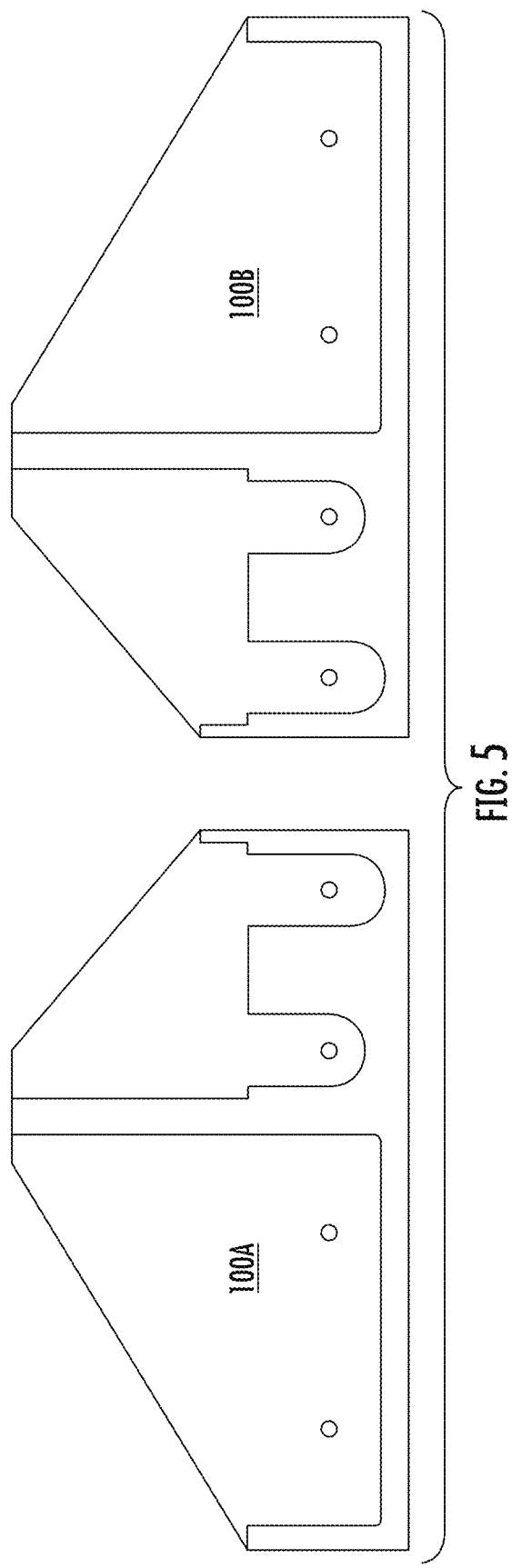
FIG. 5 shows a front view of the first embodiment of a first shower bracket of FIG. 2A and a second shower bracket, a mirror image of the bracket of FIG. 2A.
Figure 6:
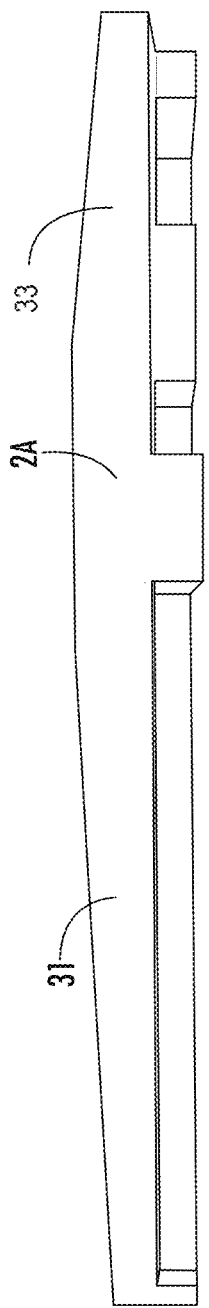
FIG. 6 shows a top view of the first embodiment of the shower bracket.

While the first recess 21 is shown on the left side of the radially extending divider wall 19 of the sectioner 7 and the second recess 23 is shown on the right side of the radially extending divider wall 19, this can be reversed, with the second recess 23 on the left side of radially extending divider wall 19 and the first recess 21 on the right side of the radially extending divider wall 19, as shown in FIG. 5—see plate 100*b*.

FIGS. 4-7, and 9 show a shower system of an embodiment of the present invention. In this embodiment, a shower system 200 comprises a first shower bracket 100*a*, a second shower bracket 100*b*, a mirror image of the first shower bracket 100*a*, whereby the first shower bracket and second shower bracket 100*a*, 100*b* preferably include the features of shower bracket 100. The shower system 200 further comprises fasteners 10*a*-10*d*, a first shelf 230, a second shelf 240, a first cylindrical rod 250 and a second cylindrical rod 260. The first shelf 230 longitudinally extends from a first end 230*a* to a second end 230*b* and is preferably J-shaped with a lip 230*c*. Similarly, the second shelf 240 longitudinally extends from a first end 240*a* to a second end 240*b* and is also preferably L-shaped. The first cylindrical rod 250 longitudinally extends from a first end 250*a* to a second end 250*b*. The second cylindrical rod 260 longitudinally extends from a first end 260*a* to a second end 260*b*.

In an embodiment, the first end 230*a* of the first shelf 230 is inserted into the first recess 21 and received on the inner wall 17*b* of the first shower bracket 100*a*, with the lip 230*c* being adjacent the first side wall 13 of the sectioner 7. The second end 230*b* of the first shelf 230 is inserted into the first recess 21 and received on the inner wall 17*b* of the second shower bracket 100*b*, with the lip 230*c* being adjacent the first side wall 13 of the sectioner 7. The first end 240*a* of the second shelf 240 is received onto and across the first retaining shoulder 35, the second retaining shoulder 37 and the flat top surface 25*a* of the truncated radially extending divider wall 25 of the first shower bracket 100*a*. The second end 240*b* of the second shelf 240 is received on the first retaining shoulder 35, the second retaining shoulder 37, and the flat top surface 25*a* of the truncated radially extending divider wall 25 of the second shower bracket 100*b*.

In this embodiment, the shower system 200 further includes the first end 250*a*, of the first cylindrical rod 250 is received into the first u-shaped slot 27 of the first shower bracket 100*a* and the second end 250*b* of the first cylindrical rod 250 is received into the first u-shaped slot 27 of the second shower bracket 100*b*. The first end 260*a* of the second cylindrical rod 260 is received into the second u-shaped slot 29 of the first shower bracket 100*a* and the second end 260*b* is received into the second u-shaped slot 29 of the second shower bracket 100*b*.

The first shower bracket 100*a* and the second shower bracket 100*b* are mounted opposite each other to a wall 30 by fasteners 10*a*, 10*b*, 10*c*, 10*d*. The fasteners can be any one of or a combination of concrete screws, drywall screws, wooden screws, sheet metal screws, machine screws, collated screws, framing nails, finishing nails, box nails, common nails, brad nails, siding nails, flooring nails, joist hanger nails with masonry anchors, concrete anchors, drywall anchors, rivets, inserts, and retaining rings.

The shelves 230 and 240 may be a wet shelf, a wire shelf, an upper shelf, a lower shelf, cabinets, a drop down shelf, or a dry shelf. While the shelves are shown in the Figures to be of a certain width, the width of the shelves can be altered to accommodate different storage means. For example, the shelves may be of a width to accommodate folded towels of various sizes.

The cylindrical rods 250 and 260 may be a single bar, a double swing bar, a two-arm swivel bar, a miniature bar, a double metal bar, a wire bar, a wooden bar, an electric heated bar, a shower curtain bar. In some embodiments, the cylindrical rods 250, 260 are rigid rods and in other embodiments the cylindrical rods are telescoping rods.

Figure 8:
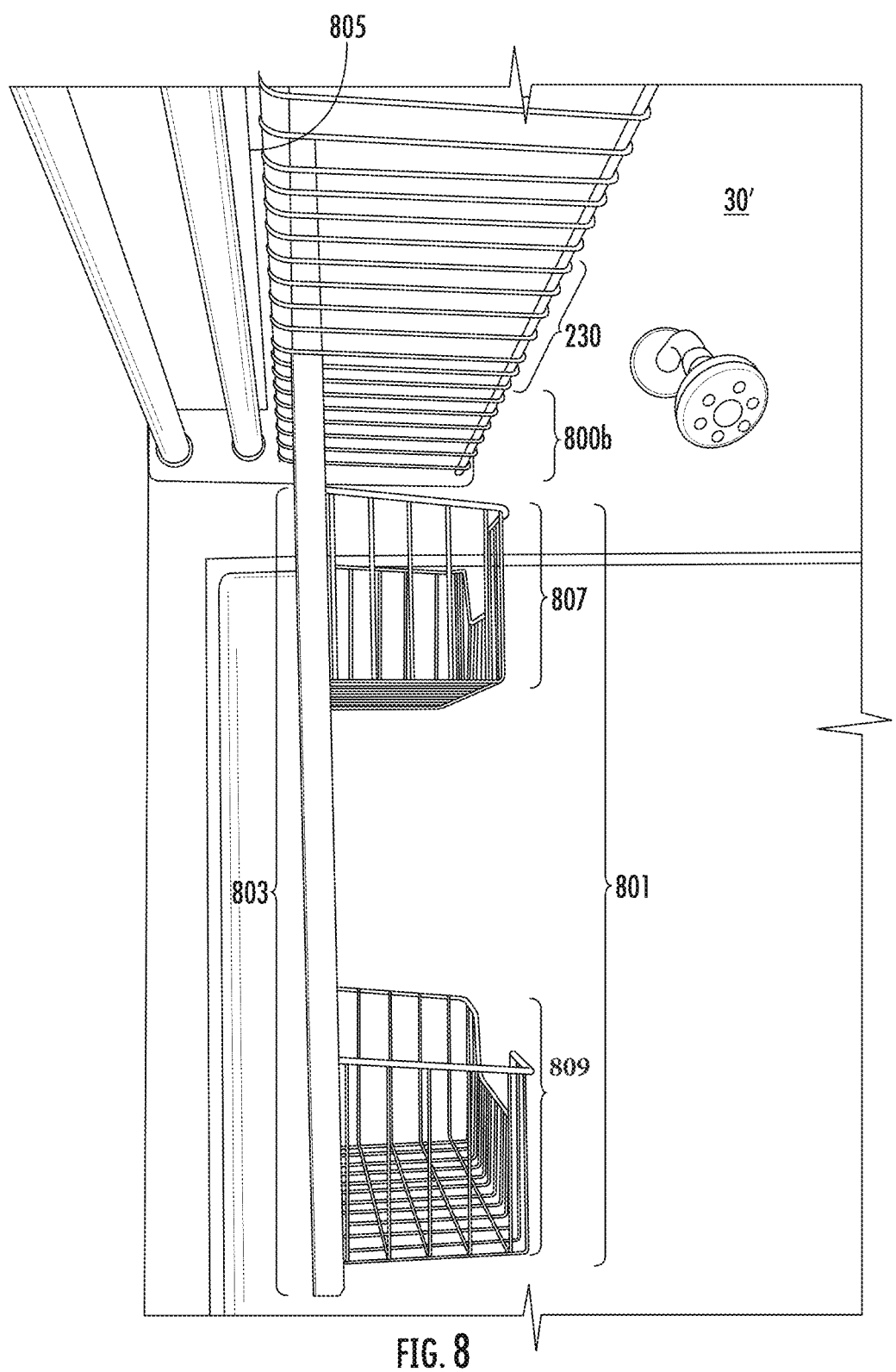
FIG. 8 shows a front view of the first embodiment of the shower system having a drop shelf.
Figure 9:
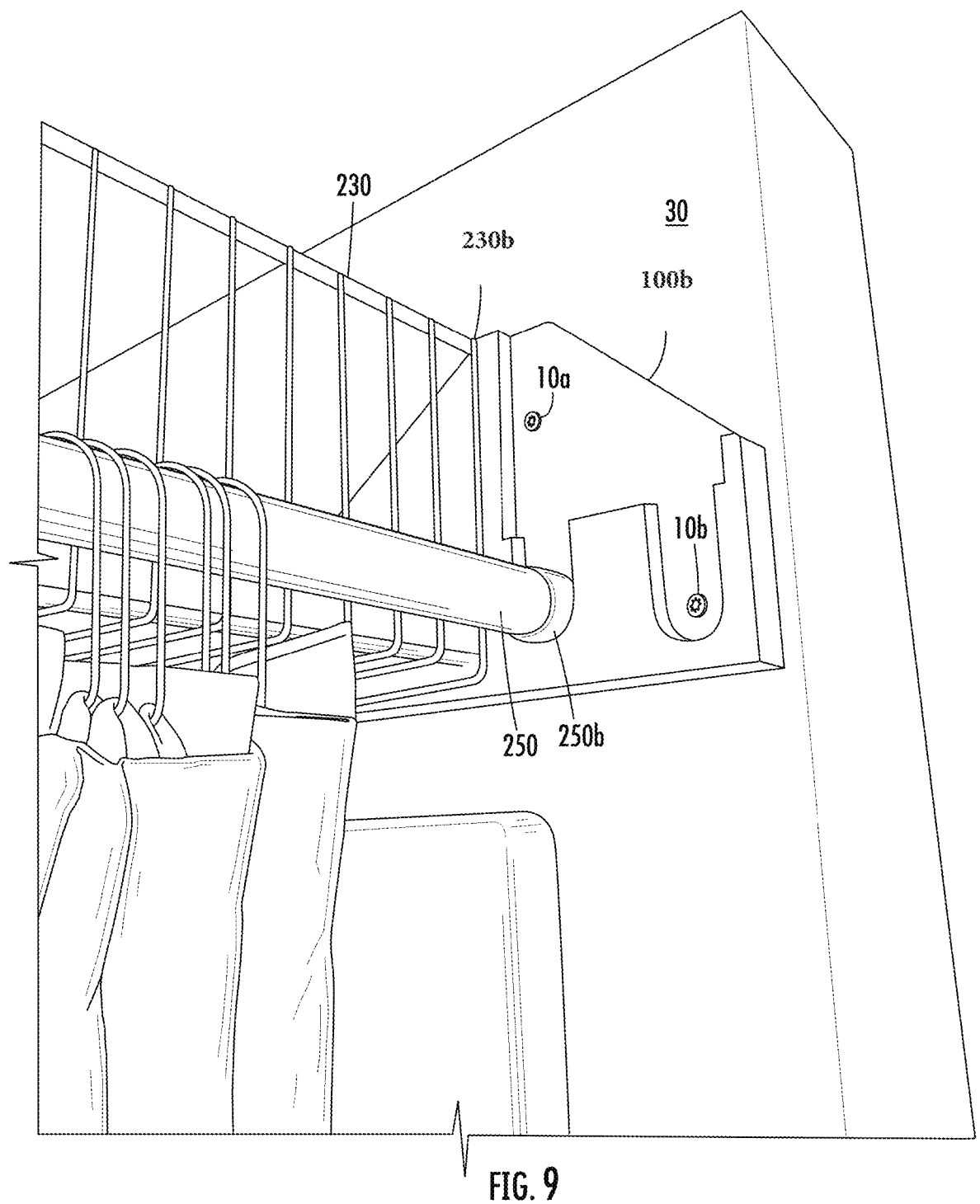
FIG. 9 shows a perspective view of the first embodiment of the shower system.

FIG. 8 shows a drop shelf 801 having an axially extending spine 803 attached through one or more hooks 805 to the longitudinally extending bar of the shelf 230 that is inserted into the first recess 21 and received on the inner wall 17*b* of the second shower bracket 100*b* of shower system 200. The drop shelf 801 provides storage and storage access on the wet side of the shower/tub through one or more shelving units 807, 809 attached to the axially extending spine 803 and facing the wet side of the shower tub. The shelving units 807 and 809 are also capable of facing the dry side or with each of the shelving units 807, 809 facing opposite directions. In yet another embodiment, the drop shelf 801 can be double sided with shelving units 807, 809 on both sides, facing the wet side and the dry side. Drop shelf 801 is capable of attaching at any position along shelf 230. In on embodiment, the drop shelf 801 is attached to and located at one end of shelf 230. Hooks 805 of drop shelf 801 can be received by the longitudinally extending bars of the shelf 230 to connect to the drop shelf 801 to shelf 230. In another embodiment, the drop shelf 801 can be placed adjacent one of the shower brackets, such that the spine 803 is parallel to the shower bracket. Drop shelf 801 can have a plurality of hooks 805 attached to the axially extending spine 803 to prevent movement, such as rotation, when the drop shelf 801 is connected to shelf 230. Plexiglass or a white plastic backer with a flexible edge can be used to close a gap between an end wall and a shower curtain.

In another embodiment, the drop shelf 801 can have additional brackets which extend and contact the floor or the ledge of the tub or any other lip of a shower stall to add additional bracing to the drop shelf 801.

Figure 10:
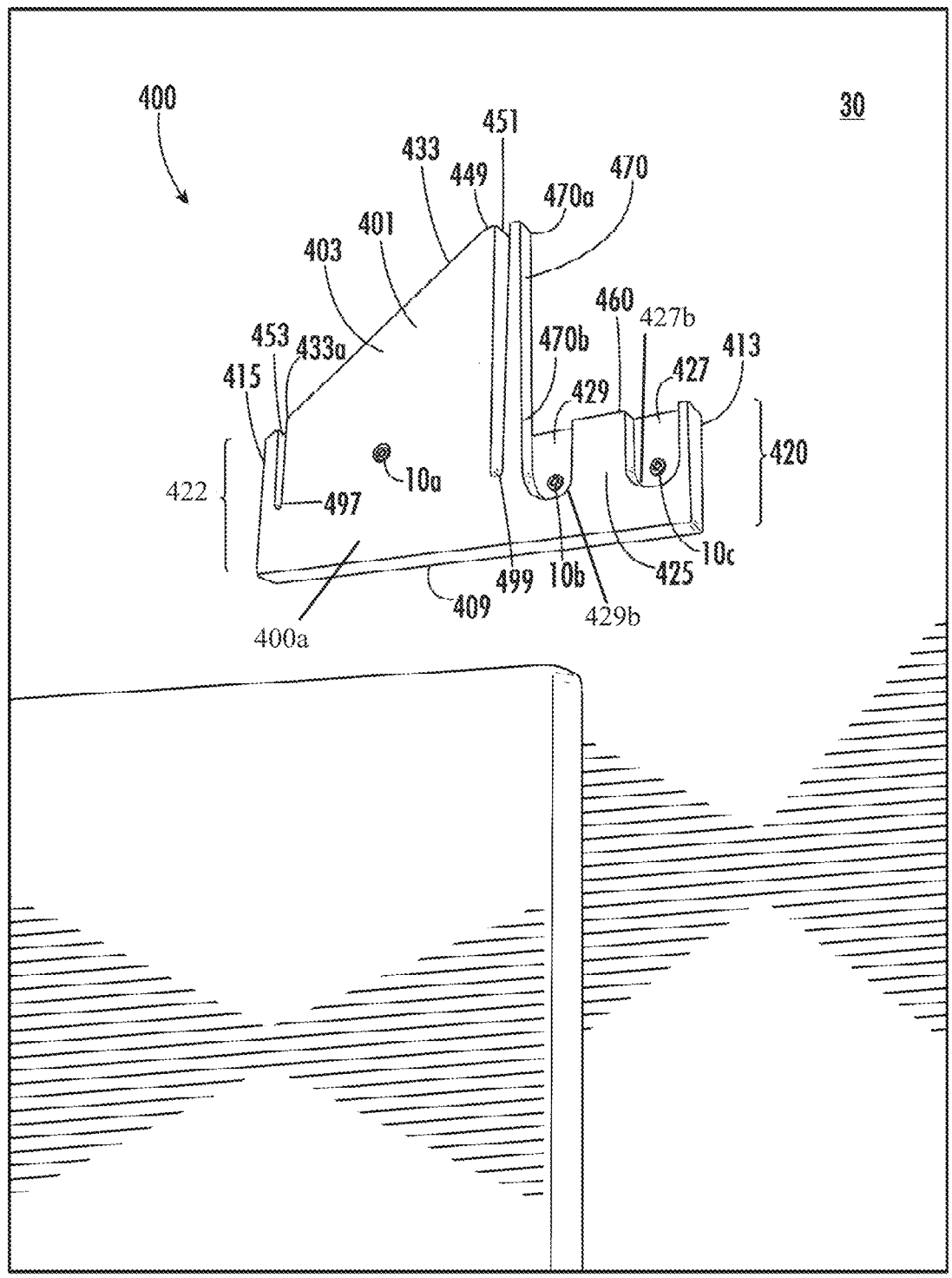
FIG. 10 shows a perspective view of a second embodiment of the shower bracket.

FIG. 10 shows a bracket of a second embodiment of the present invention.

In an embodiment, a shower bracket 400 comprises a plate 401 having a front face 403, a back face 405 (not shown), a bottom surface 409, a truncated first side surface 413 at a first end 420 perpendicular to the bottom surface 409, a second side surface 415 at a second end 422 opposite the first truncated side surface 413, perpendicular to the bottom surface 409, and a top surface 449 connected to the first side surface 413 by a perpendicular median wall 470 and a top platform 460. The perpendicular median wall 470 has an upper end 470a, forming part of the top surface 449, and a lower end 470b. The tops surface 449 is also connected to the second side surface 415 through a diagonal portion 433.

The front face 403 also includes a first channel 451 adjacent to the median wall 470 and intersecting the top surface 449 extending a length from top surface 449 to an end point 499 parallel to the top platform 460. The end point 499 of the first channel 451 does not intersect with the bottom surface 409. A second channel 453 is adjacent to the second side wall 415 and extends from the diagonal portion 433 to an end point 497 in parallel with the first channel 451. The end point 497 of the second channel 453 is preferably aligned with end point 499 of the first channel 451.

The shower bracket 400 also includes a first u-shaped slot 427 that is defined by the truncated first side surface 413 at the first end 420, a truncated radially extending divider wall 425, and a rounded wall 427b. A second u-shaped slot 429 is defined by the median wall 470, a rounded wall 429b, and the truncated radially extending divider wall 425.

Figure 11:
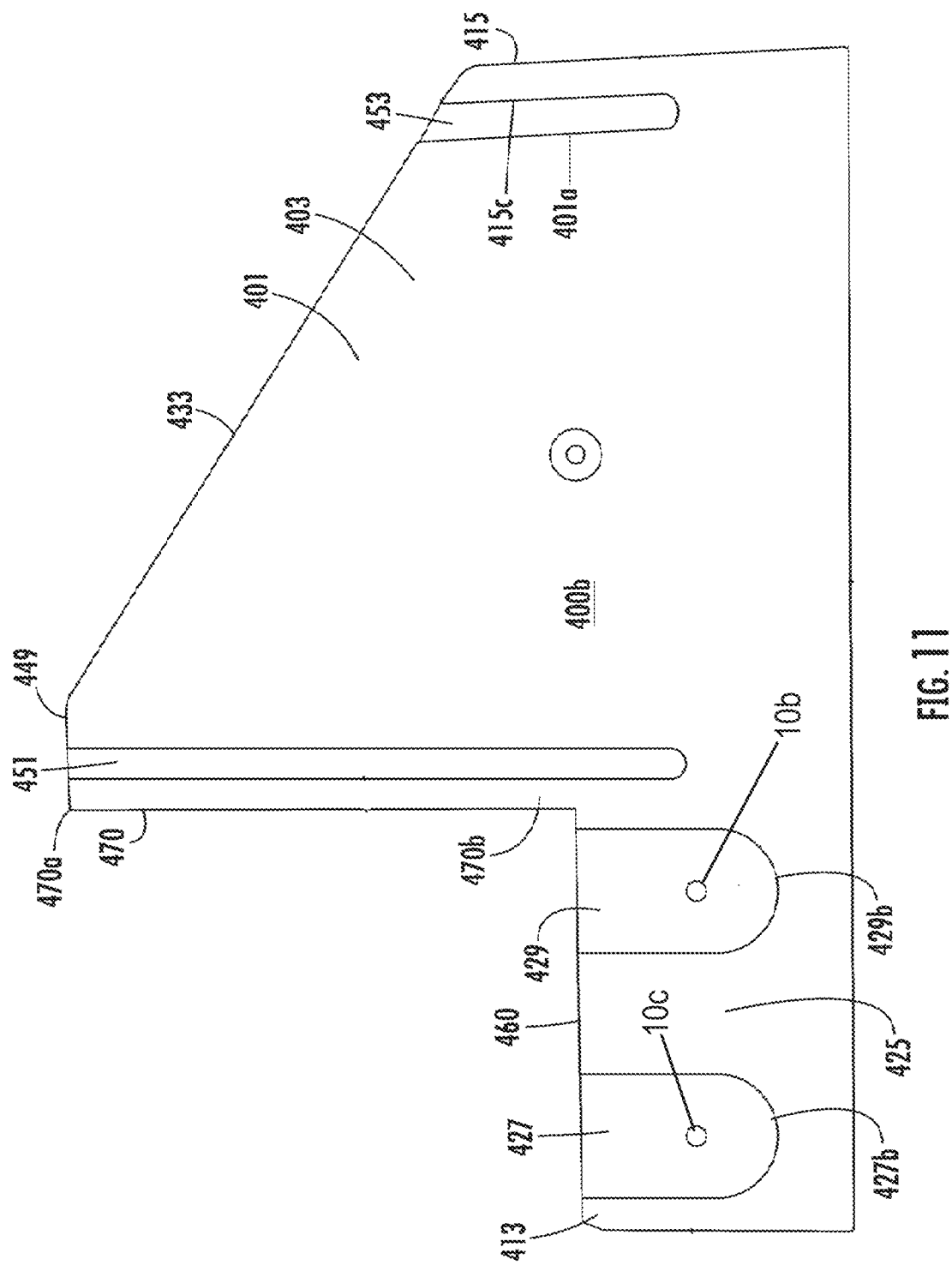
FIG. 11 shows a front view of the second embodiment of the shower bracket.

It should be noted that while the first u-shaped slot 427 and the second u-shaped slots 429 are shown as being on the right side of the median wall 470 in FIG. 10, however, the first u-shaped slot 427 and the second u-shaped slots 429 can also be present on the left side of the median wall 470 of the plate 400b as shown in FIG. 11, in a mirror image.

Figure 12:
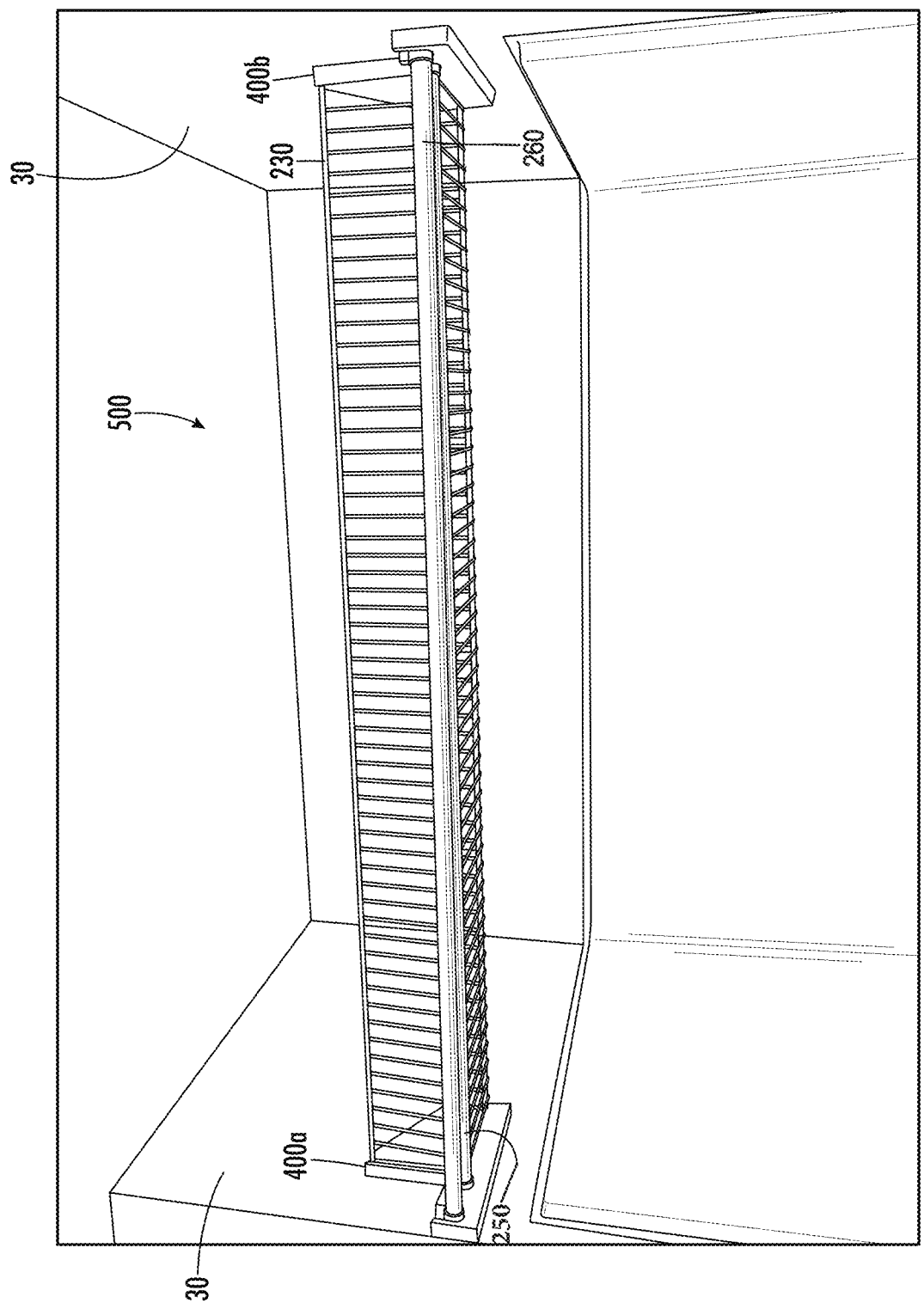
FIG. 12 shows a front view of a second embodiment of the shower system.
Figure 13:
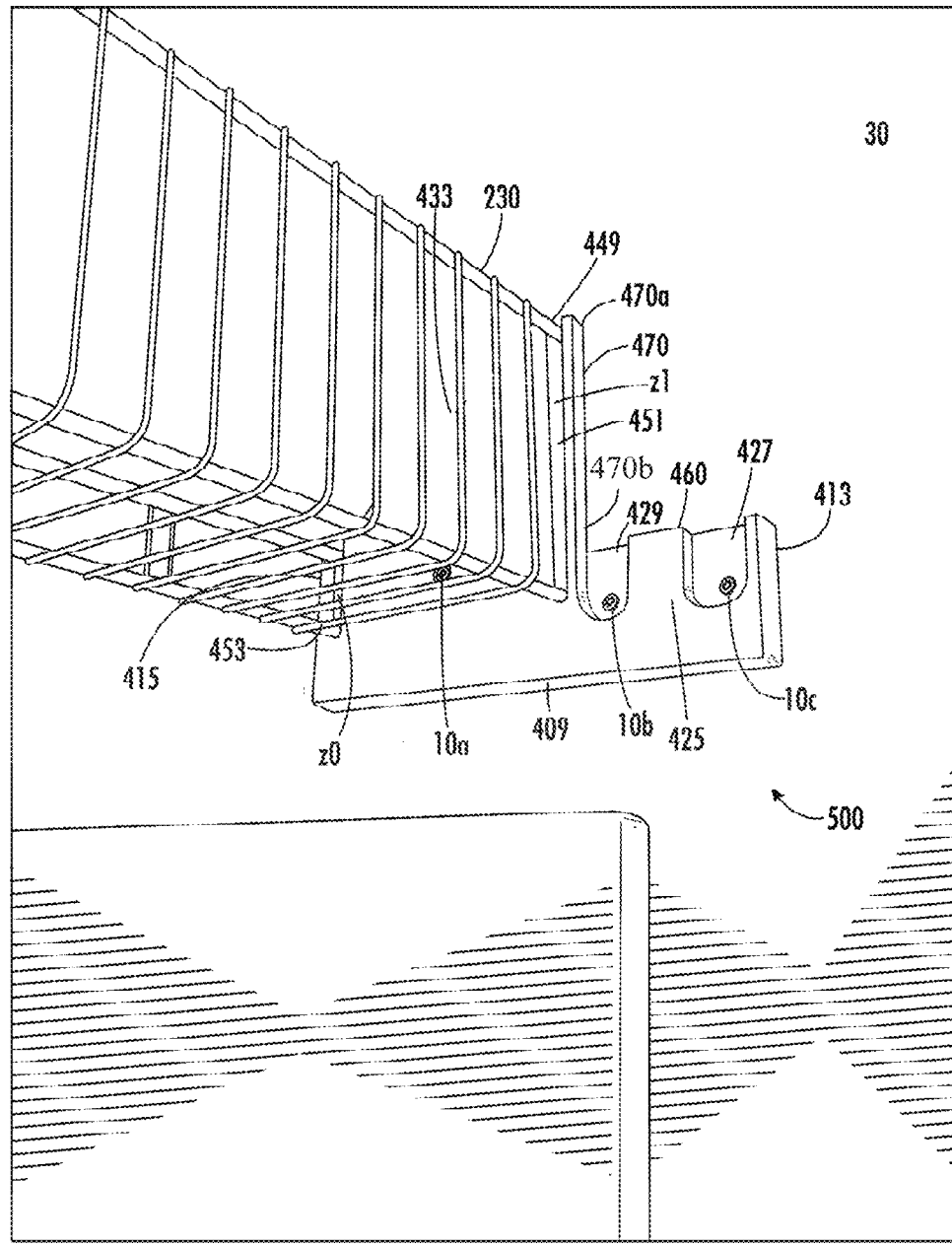
FIG. 13 shows a perspective view of the second embodiment of the shower system.
Figure 14:
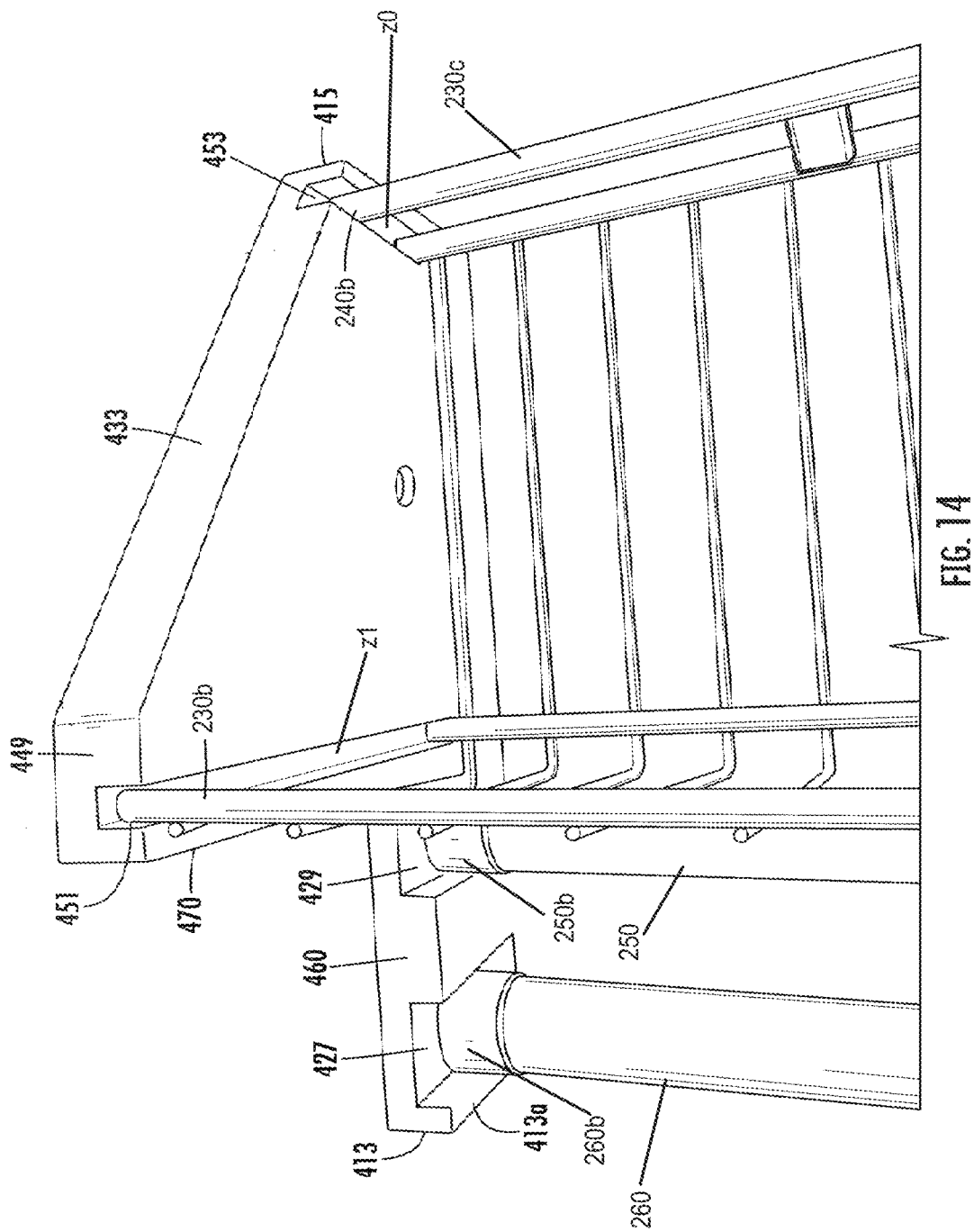
FIG. 14 shows a top perspective view of the second embodiment of the shower system.

FIGS. 12-14 show the shower system of another embodiment of the present invention. In this embodiment, a shower system 500 comprises a first shower bracket 400a, a second shower bracket 400b, a mirror image of the first shower bracket 400a, whereby the first shower bracket and the second shower bracket 400a, 400b preferably include the features of shower bracket 400. The shower system 500 further comprises fasteners 10a-10d, a shelf 230, a first cylindrical rod 250 and a second cylindrical rod 260. The shelf 230 is preferably J-shaped with a lip 230c and longitudinally extends from the first end 230a to a second end 230b. The first cylindrical rod 250 longitudinally extends from a first end 250a to a second end 250b. The second cylindrical rod 260 longitudinally extends from a first end 260a to a second end 260b.

The first end 230a of longitudinally extending bar Z0 is received within the second channel 453 and the longitudinally extending bar Z1 of the first end 230a of J-shaped shelf 230 is received within the first channel 451 of the first shower bracket 400a. The second end 230b of the longitudinally extending bar Z0 is received within the second channel 453 and the and the longitudinally extending bar Z1 of the first end 230a of J-shaped shelf 230 is received within the first channel 451 of the second shower bracket 400b.

The first end 260a of the first cylindrical rod 260 is received within the first u-shaped slot 427 of the first shower bracket 400a. The second end 260b of the first cylindrical rod 260 is received within the first u-shaped slot 427 of the second shower bracket 400b. The first end 250a of the second cylindrical rod 250 is received within the second u-shaped slot 429 of the first shower bracket 400a, and the second end 250b is received within the second u-shaped slot 429 of the second shower bracket 400b.

In another embodiment (not shown in the Figures), the shower system 500 has a second shelf 240, longitudinally extending, having a first end 240a and a second end 240b. The first end 240a is received onto the platform 460 of the first shower bracket 400a, and the second end 240b is received onto the platform 460 of the second shower bracket 400b.

Figure 15:
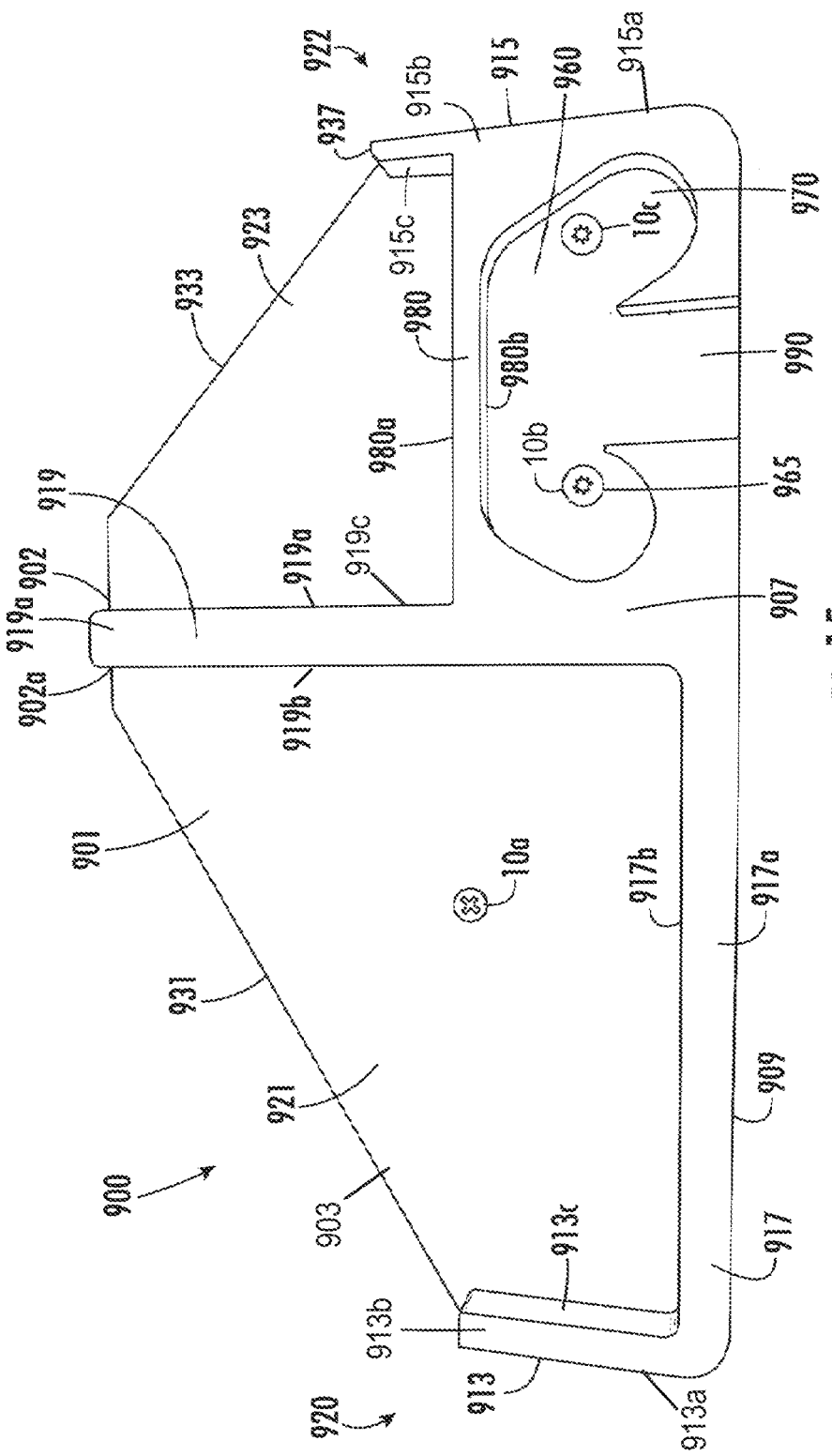
FIG. 15 shows a front view of a third embodiment of the shower bracket.
Figure 16:
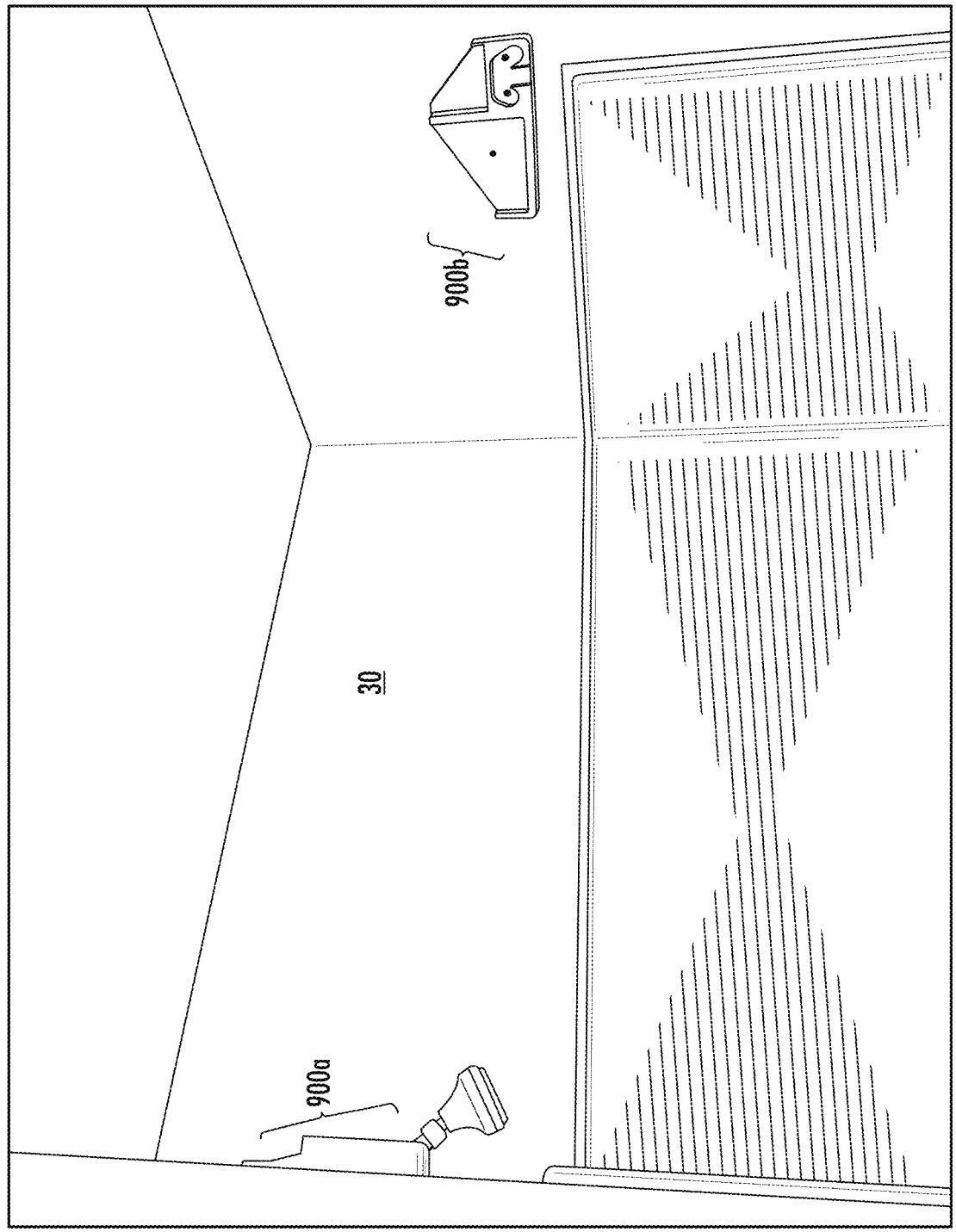
FIG. 16 shows a side perspective view of the third embodiment of the shower bracket.

FIGS. 15-16 show a bracket of a third embodiment of the present invention.

In an embodiment, a shower bracket 900 comprises a plate 901 having a front face 903, a back face 905 (not shown), and shaped to have a perimeter with a bottom surface 909, a first side surface 913a at a first end 920 perpendicular to the bottom surface 909, a second side surface 915a at a second end 922 opposite the first side surface 913a, perpendicular to the bottom surface 909, and a top surface 902 connected to the first side surface 913a and the second side surface 915a. Between the first side surface 913a and the top surface 902 is a first diagonal top portion 931 and between the second side surface 913a and the top surface 902 is a second diagonal top portion 933. The top surface 902 can include a middle flat top portion 902a connected to the first diagonal top portion 931 and the second diagonal top portion 933.

A sectioner 907 is mounted to the front face 903 of the plate 901 with the sectioner 907 having a bottom wall 917, aligned with the bottom surface 909 of the plate 901, connected to the first side wall 913 of the sectioner 907 aligned with the first side surface 913a of the plate 901 and a second side wall 915 aligned the second side surface 915a of the plate 901. The first side wall 913 has an exposed outer surface 913b, and an inner surface 913c, and the second side wall 915 has an exposed surface 915b. The bottom wall 917 has an exposed outer surface 917a and extends longitudinally from the first end 920 to a channel 990 adjacent to the second end 922 of the plate 901. A radially extending divider wall 919, proximate to the channel 990, extends radially from the bottom wall 917 of the sectioner 907 and has an exposed surface 919a. The sectioner 907 also has a horizontal wall 980, perpendicular to the radially extending divider wall 919 and parallel to the bottom surface 909 of the plate 901 with a top surface 980a and a bottom surface 980b.

In this embodiment, a first recess 921 is defined by the front face of the plate 903, the bottom wall 917 of the sectioner 907, and a first inner surface 919b of the radially extending divider wall 919. A second recess 923 is defined by the front face 903 of the plate 901, the top surface 980a of the horizontal wall 980, and the second inner surface 919c of the radially extending divider wall 919, adjacent to and perpendicular with the top surface 980a. A third recess 960 is defined by the front face 903 of the plate 901, the radially extending divider wall 919, channel 990, a first rounded aperture 965, a second rounded aperture 970, and the bottom surface 980b of the horizontal wall 980. The first rounded aperture 965 is defined by the radially extending divider wall 919, the channel 990, and the bottom surface 980b of the horizontal wall 980. The second rounded aperture 970 is defined by the bottom surface 980b of the horizontal wall 980, the channel 990, and the second side surface 915.

While the first recess 921 is shown on the left side of the radially extending divider wall 919 of the sectioner 907 and the second recess 923 and the third recess 960 are shown on the right side of the radially extending divider 919, this can be reversed, with the second and third recesses 923, 960 on the left side of radially extending divider wall 919 and the first recess 921 on the right side of the radially extending divider wall 919, as shown in FIG. 16—see plate 900b.

Figure 7:
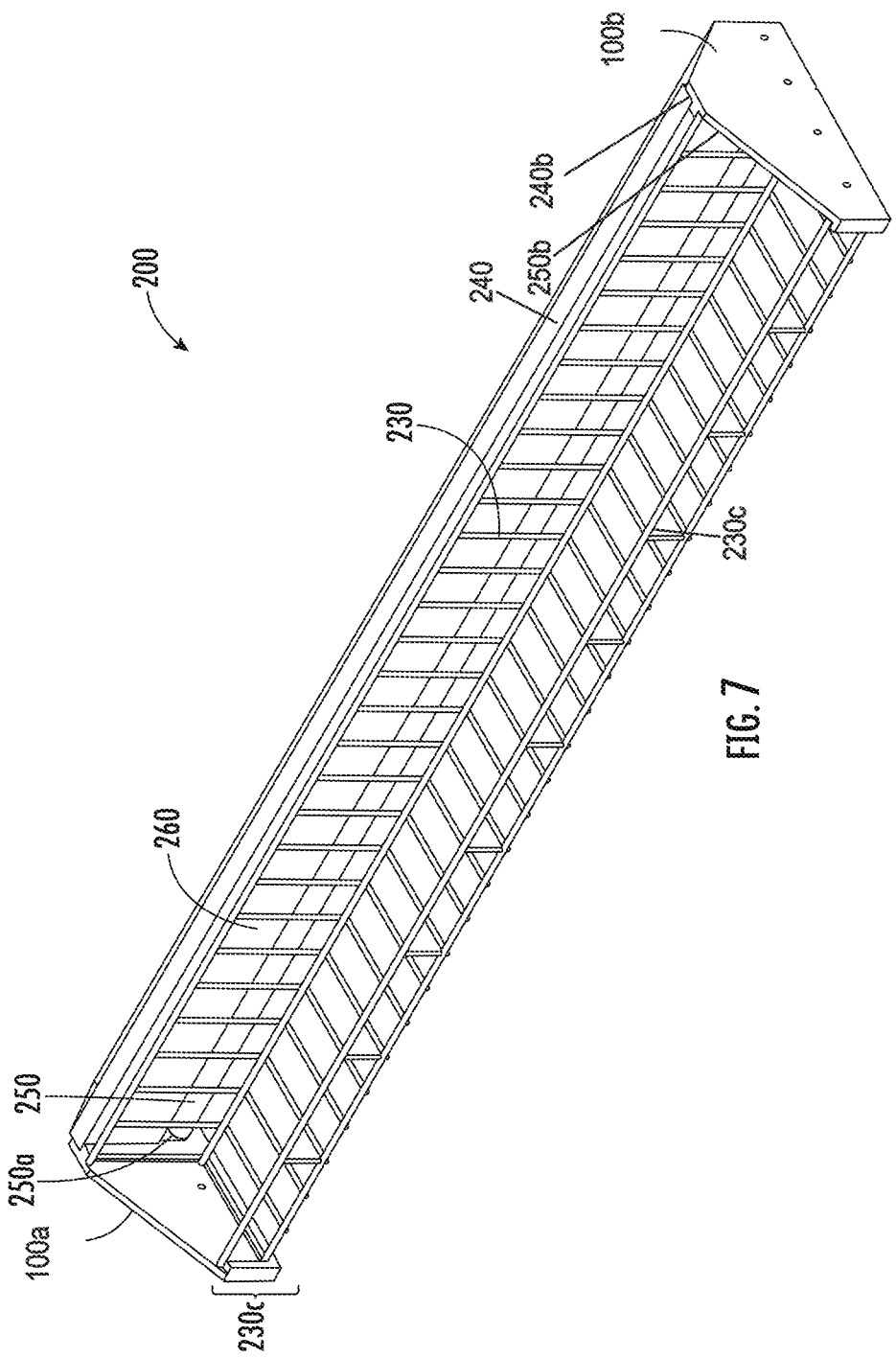
FIG. 7 shows a perspective view of the first embodiment of the shower system.
Figure 17:
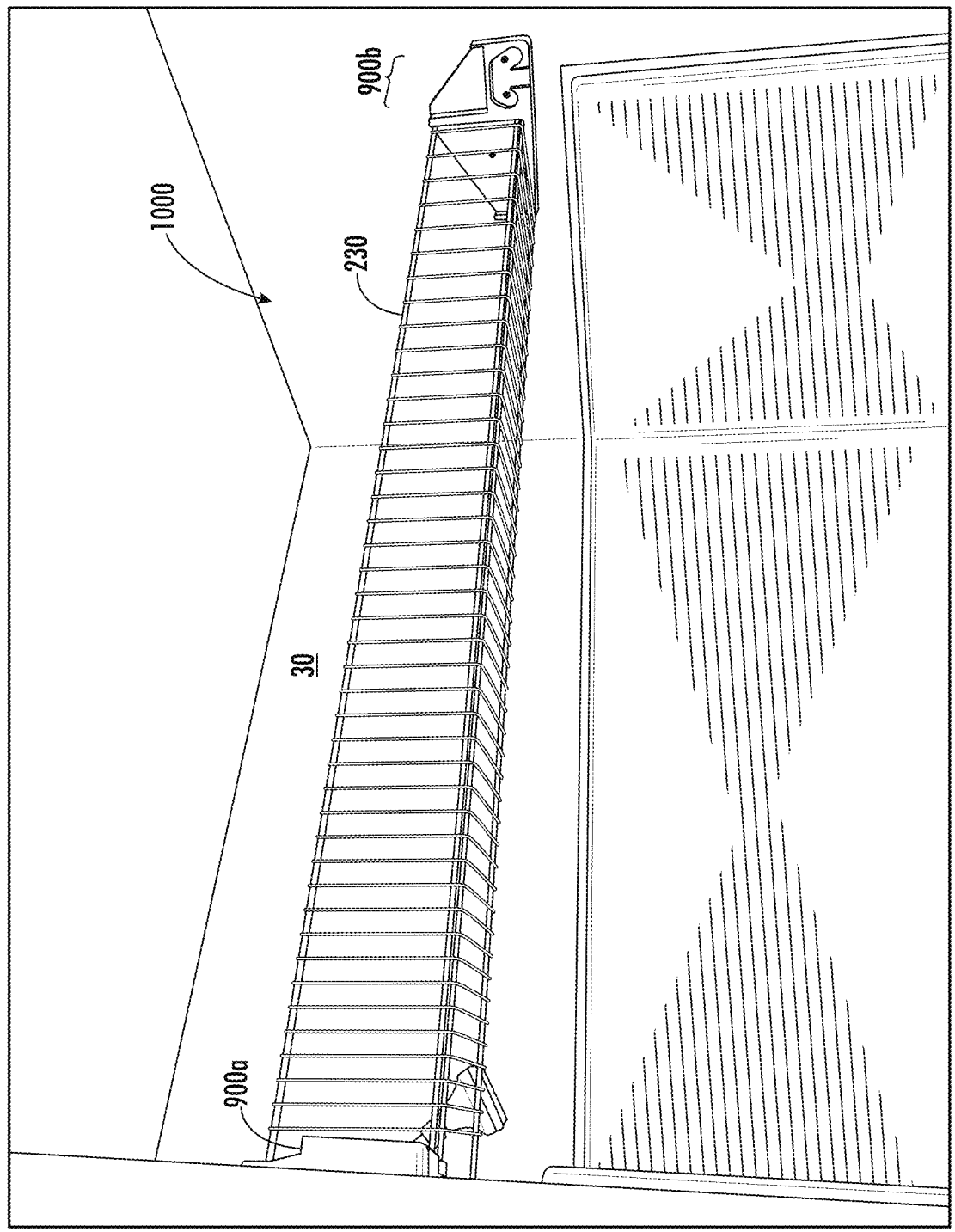
FIG. 17 shows a front-side perspective view of a third embodiment of the shower system.

FIG. 17 shows a shower system of an embodiment of the present invention. In this embodiment, the shower system 1000 comprises a first shower bracket 900a, a second shower bracket 900b, a mirror image of the first shower bracket 900a, whereby the first shower bracket and second shower bracket 900a, 900b preferably include the features of shower bracket 900. The shower system 1000 further comprises fasteners 10a-10d, a first shelf 230, a second shelf 240, a first cylindrical rod 250 and a second cylindrical rod 260. The first shelf 230 longitudinally extends from a first end 230a to a second end 230b and is preferably J-shaped with a lip 230c. Similarly the second shelf 240 longitudinally extends from a first end 240a to a second end 240b and is also L-shaped. The first cylindrical rod 250, as shown in FIG. 7, longitudinally extends from a first end 250a to a second end 250b. As shown in FIG. 7, the second cylindrical rod 260 longitudinally extends from a first end 260a to a second end 260b.

In an embodiment, the first end 230a of the first shelf 230 is inserted into the first recess 921 and received on the inner wall 917b of the first shower bracket 900a, with the lip 230c being adjacent the first side surface 913a of the sectioner 907. The second end 230b, of the first shelf 230, is inserted into the first recess 921 and received on the inner wall 917b of the second shower bracket 900b with the lip 230c being adjacent the first side surface 913a of the sectioner 907. The first end 240a of the second shelf 240 is received onto the top surface 980a of the horizontal wall 980 of the first shower bracket 900a. The second end 240b, of the second shelf 240, is received on the top surface 980a of the horizontal wall 980 of the second shower bracket 900b.

In this embodiment, the shower system 1000 further includes the first end 250a of the first cylindrical rod 250 received in a first rounded aperture 965 of the first shower bracket 900a. The second end 250b of the first cylindrical rod 250 is received in the first rounded aperture 965 of the second shower bracket 900b. The first end 260a of the second cylindrical rod 260 is received in the second rounded aperture 970 of the first shower bracket 900a, and the second end 260b is received in the second rounded aperture 970 of the second shower bracket 900b. It should be noted that the ends 250a, 250b, 260a, 260b can pass through the channel 990 prior to being inserted into the first rounded aperture 965 or the second rounded aperture 970. In this embodiment, shower system 1000, through the first recess 921, second recess 923, the third recess 960, and channel 990 enables independent assembly, or removal, of any of the longitudinal shelves 230, 240, or the cylindrical rods 250, 260.

Figure 18:
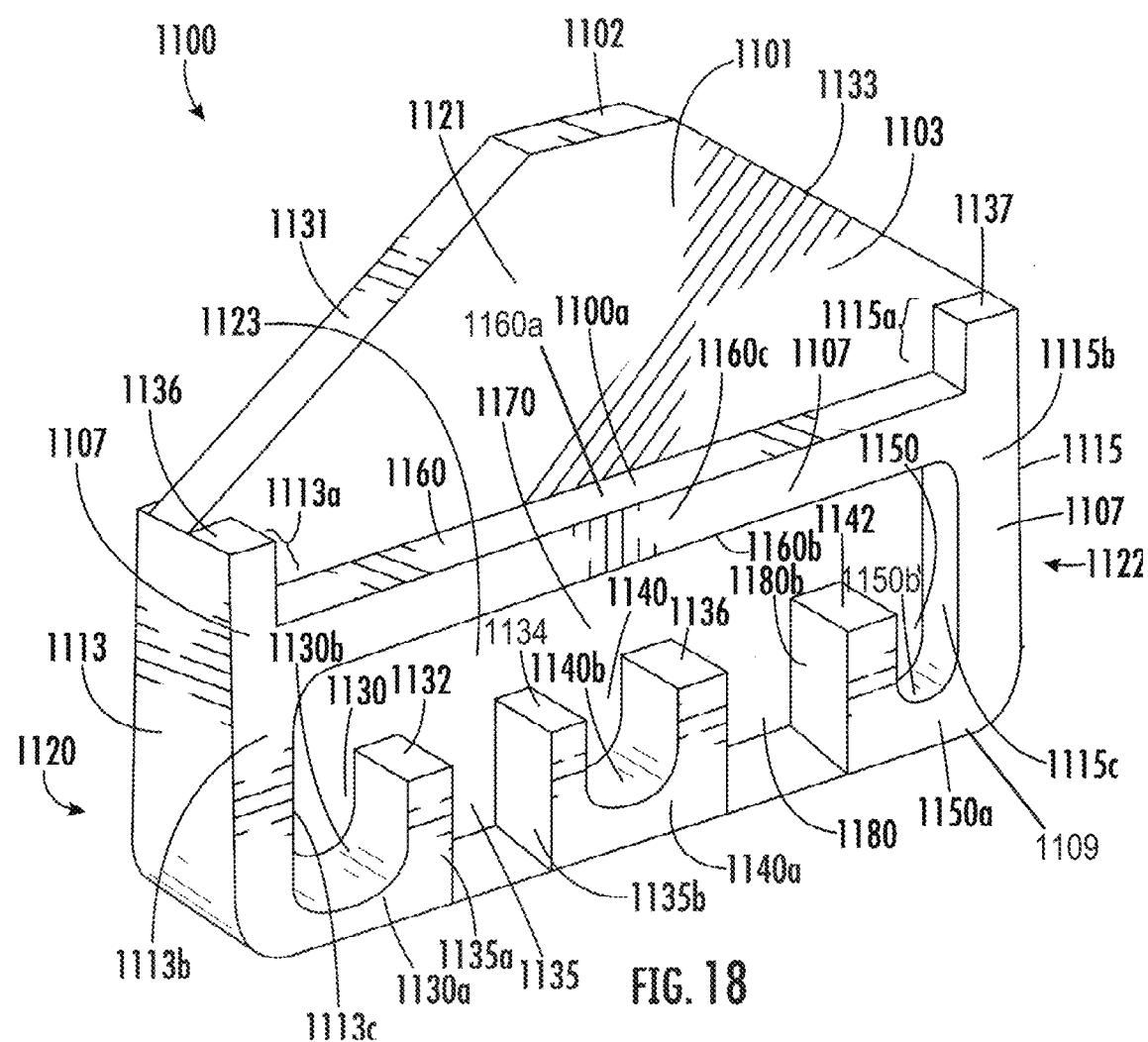
FIG. 18 shows a perspective view of a fourth embodiment of a shower bracket.

FIG. 18 shows a bracket of a fourth embodiment of the present invention.

In this embodiment, a shower bracket 1100 comprises a plate 1101 having a front face 1103, a back face 1105 (not shown), and shaped to have an outer perimeter with a bottom surface 1109, a first side surface 1113b at a first end 1120 perpendicular to the bottom surface 1109, a second side surface 1115b at a second end 1122. Between the first side surface 1113b and the top surface 1102 is a first diagonal portion 1131 and between the second side surface 1115b and the top surface 1102 is a second diagonal portion 1133. The top surface 1102 can include a middle flat top portion connected to the first diagonal top portion 1131 and the second diagonal top portion 1133.

A sectioner 1107 is mounted to the front face 1103 of the plate 1101. The sectioner 1107 has a longitudinally extending divider wall 1160 that extends from the first side surface 1113b, of the first side wall 1113, to the second side surface 1115b, of the second side wall 1115. The longitudinally extending divider wall 1160 has top surface 1160a, a bottom surface 1160b, and an outer surface 1160c. The first sectioner wall 1113 and the divider wall 1160 define a first retaining shoulder 1136 and the second sectioner wall 1115 and the divider wall 1160 define a second retaining shoulder 1137.

The first recess 1121 of the shower bracket 1100 is defined by the front face 1103 of the plate 1101, the first retaining shoulder 1136 at the first side surface 1113b, and the second retaining shoulder 1137 at the second side surface 1115b of the longitudinally extending divider wall 1160.

The first sectioner wall 1113c extends towards and is partially aligned with the bottom surface 1109 of the plate 1100, defining a c-shaped arcuate 1130. The second sectioner wall 1115c extends towards and is partially aligned with the bottom surface 1109 of the plate 1100, defining a j-shaped arcuate 1150 (mirror image c-shaped arcuate). Between the c-shaped arcuate 1130 and the j-shaped arcuate 1150, aligned with the bottom surface 1109 of the plate 100 is a u-shaped arcuate 1140. Between the c-shaped arcuate 1130 and the u-shaped arcuate 1140 of the sectioner 1107 is a first channel 1135. Between the u-shaped arcuate 1140 and the j-shaped arcuate 1150 of the sectioner 1107 is a second channel 1180.

The c-shaped arcuate 1130 is further defined by a shoulder 1132, a rounded bottom 1130b, and an exposed outer surface 1130a. The first channel 1135 is further defined by a wall 1135a of the c-shaped arcuate 1130 and wall 1135b of the u-shaped arcuate 1140. The u-shaped arcuate 1140 is further defined by shoulders 1134, 1136, a rounded bottom 1140b, and an outer facing surface 1140a. The second channel 1180 is further defined by a wall 1180a of the u-shaped arcuate 1140 and a wall 1180b of the j-shaped arcuate 1150. The j-shaped arcuate 1150 is further defined by a shoulder 1142, a rounded bottom 1150b, and an outer surface 1150a.

A bottom or second recess 1170 is defined by the bottom surface 1160b of the divider wall 1160, the c-shaped arcuate 1130, the first channel 1135, the u-shaped arcuate 1140, the second channel 1180, and the j-shaped arcuate 1150.

The first recess 1121 receives a shelf 230, 240 and the second recess 1170 receives cylindrical rods 250, 260 which can seat in c-shaped arcuate 1130, u-shaped arcuate 1140 and j-shaped arcuate 1150 by passing through channels 1135, 1180.

Figure 22:
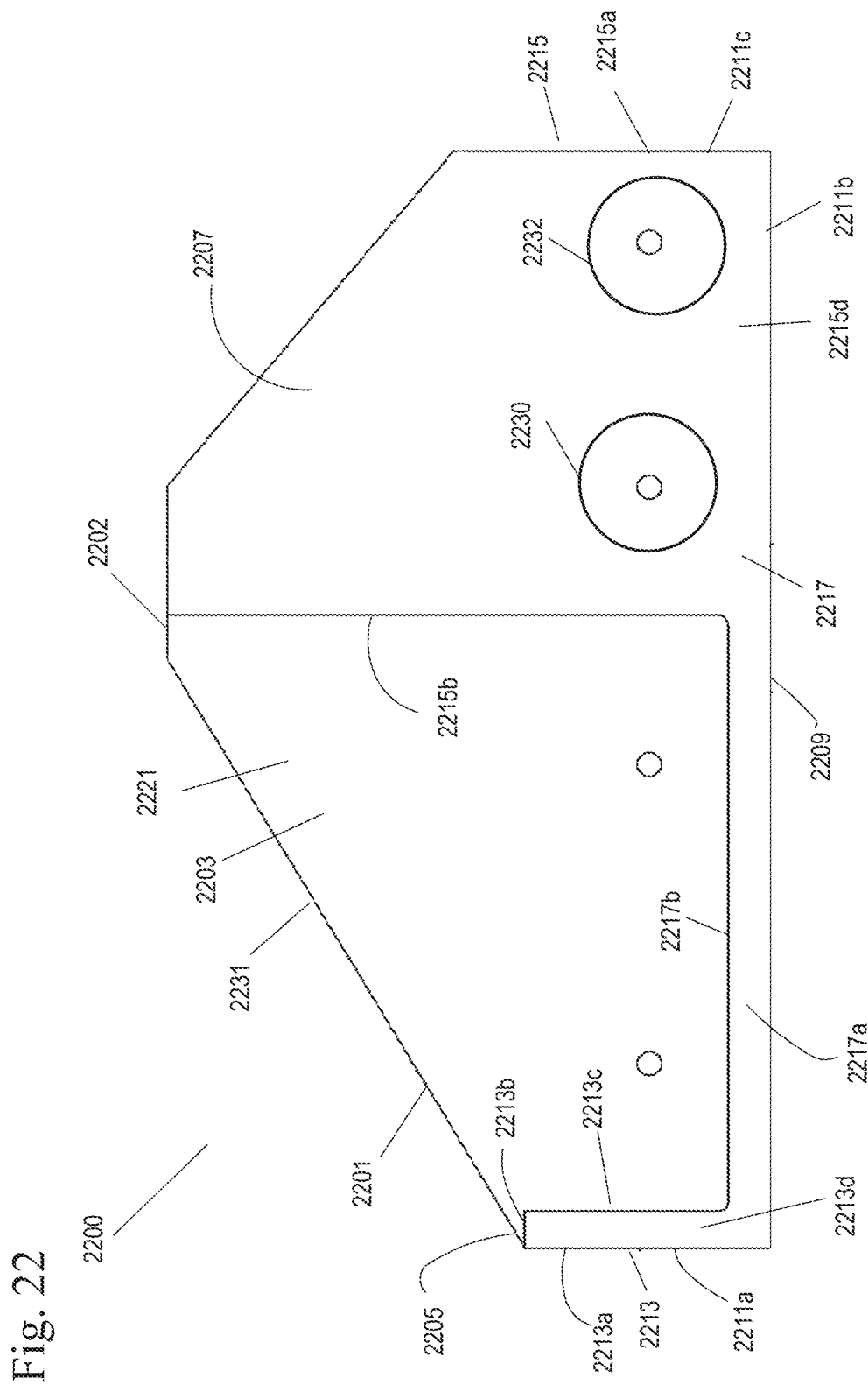
FIG. 22 shows a front view of a shower bracket of another embodiment.

FIG. 22 shows a shower bracket 2200 of another embodiment. In this embodiment, the plate 2201 has a front face 2203, a back face 2205, a bottom surface 2209, a first side surface 2211a connected to the bottom surface 2209, a second side surface 2211c connected to the bottom surface 2209 and opposite the first side surface 2211a and a top surface 2202. Between the first side surface 2211a and the top surface 2202 is a first diagonal top portion 2231 and between the second side surface 2211c and the top surface 2202 is a second diagonal top portion 2232.

A sectioner 2207 is mounted to the front face 2203 of the plate 2201. The sectioner 2207 has a first side wall 2213 having an outer surface 2213a, a top outer surface 2213b, an inner surface 2213c and an exposed outer surface 2213d, and a second side wall 2215 with a top outer surface 2215d. A bottom wall 2217 of the sectioner 2207 including an inner wall 2217b, an exposed outer surface 2217a, and the bottom wall 2217 extends longitudinally from the first side surface 2211a to the second side surface 2211c of the plate 2201. The first side surface 2211a has an exposed outer surface 2213a and the second side surface 2211b has a radially extending wall 2215b with an exposed outer surface.

Extending from the inner wall 2217*b* of bottom wall 2217 of the sectioner 2207 is the radially extending wall 2215*b*.

In this embodiment, a first recess 2221 is defined by the front face 2203 of the plate 2201, the bottom wall 2217 of the sectioner 2207, the inner surface 2213*c* of the first side wall 2213 of the sectioner 2207 and the radially extending wall 2215*b* of the sectioner 2207. A second recess 2230 and a third recess 2232 is defined by the top outer surface 2215*d* of the sectioner 2207.

While the first recess 2221 is shown on the left side, adjacent the first side surface 2211*a*, the first recess 2221 can also be located on the right side adjacent the radially extending wall 2215.

In a shower system of an embodiment, a first shower bracket and a second shower bracket, which is a mirror image of the first shower bracket is mounted to the walls 30 of the shower opposite each other by fasteners 10*a*, 10*b*, 10*c*, 10*d*. The fasteners can be any one of or a combination of concrete screws, drywall screws, wooden screws, sheet metal screws, machine screws, collated screws, framing nails, finishing nails, box nails, common nails, brad nails, siding nails, flooring nails, joist hanger nails with masonry anchors, concrete anchors, drywall anchors, rivets, inserts, and retaining rings.

In this embodiment, the first shower bracket and the second shower bracket is bracket 2201. As in FIGS. 4-7 and 9, the shower system further comprises fasteners 10*a*-10*d*, a first shelf 230, a first cylindrical rod 250 and a second cylindrical rod 260. The first shelf 230 longitudinally extends from a first end 230*a* to a second end 230*b* and is preferably J-shaped with a lip 230*c*. The first cylindrical rod 250 longitudinally extends from a first end 250*a* to a second end 250*b*. The second cylindrical rod 260 longitudinally extends from a first end 260*a* to a second end 260*b*.

In an embodiment, the first end 230*a* of the first shelf 230 is inserted into the first recess 2221 and received on the radially extending wall 2215*b* of the first shower bracket, with the lip 230*c* being adjacent the first side wall 2213 of the sectioner 2207. The second end 230*b* of the first shelf 230 is inserted into the first recess 2221 and received on the radially extending wall 2215*b* of the second shower bracket, with the lip 230*c* being adjacent the first side wall 2213 of the sectioner 2207.

In this embodiment, the shower system further includes the first end 250*a*, of the first cylindrical rod 250 is received into the second recess 2230 of the first shower bracket and the second end 250*b* of the first cylindrical rod 250 is received into the second recess 2230 of the second shower bracket. The first end 260*a* of the second cylindrical rod 260 is received into the third recess 2232 of the first shower bracket 100*a* and the second end 260*b* is received into the third recess 2232 of the second shower bracket 100*b*. In this embodiment, both the first cylindrical rod 250 and the second cylindrical rod 260 are preferably telescoping rods that include a tensioning means within the rod. The first and second cylindrical rods 250, 260 as well as the first shelf 230 are independently removeable from the shower brackets 2201.

The first shelf 230 may be a wet shelf, a wire shelf, an upper shelf, a lower shelf, cabinets, a drop down shelf, or a dry shelf.

The cylindrical rods 250 and 260 may be a single bar, a double swing bar, a two-arm swivel bar, a miniature bar, a double metal bar, a wire bar, a wooden bar, an electric heated bar, a shower curtain bar.

A drop down shelf 801 can be attached to the first shelf 230.

Alternatively, the shower bracket 2201 can be paired with any of the other shower brackets 100, 400, 900, 1100 of other embodiments.

For example, with the first shower bracket 2201 and the second shower bracket 100 in a shower system, the first end 230*a* of the first shelf 230 is received by the first recess 2221 of the first shower bracket 2201 and the second end 230*b* of the first shelf 230 is received by the first recess 21 of the second shower bracket 100. The first end 250*a* of the first cylindrical rod 250 is received within the second recess 2230 of the first shower bracket 2201 and the second end 250*b* of the first cylindrical rod 250 is received by the first U-shaped slot 27 of the second shower bracket 100. The first end 260*a* of the second cylindrical rod 260 is received within the third recess 2232 of the first shower bracket 2201 and the second end 260*b* of the second cylindrical rod 260 is received within the second U-shaped slot 29 of the second shower bracket 100.

In another example, with the first shower bracket 2201 and the second shower bracket 400, in a shower system, the first end 230*a* of the first shelf 230 is received by the first recess 2221 of the first shower bracket 2201 and the second end 230*b* of the first shelf 230 is received by the first and second channels 451, 453 of the second shower bracket 400. The first end 250*a* of the first cylindrical rod 250 is received within the second recess 2230 of the first shower bracket 2201 and the second end 250*b* of the first cylindrical rod 250 is received by the first U-shaped slot 427 of the second shower bracket 100. The first end 260*a* of the second cylindrical rod 260 is received within the third recess 2232 of the first shower bracket 2201 and the second end 260*b* of the second cylindrical rod 260 is received within the second U-shaped slot 429 of the second shower bracket 100.

In another example, with the first shower bracket 2201 and the second shower bracket 900 in a shower system, the first end 230*a* of the first shelf 230 is received by the first recess 2221 of the first shower bracket 2201 and the second end 230*b* of the first shelf 230 is received by the first recess 921 of the second shower bracket 900. The first end 250*a* of the first cylindrical rod 250 is received within the second recess 2230 of the first shower bracket 2201 and the second end 250*b* of the first cylindrical rod 250 is received by the first rounded aperture 965 of the second shower bracket 900. The first end 260*a* of the second cylindrical rod 260 is received within the third recess 2232 of the first shower bracket 2201 and the second end 260*b* of the second cylindrical rod 260 is received within the second rounded aperture 970 of the second shower bracket 900.

In yet another example, with the first shower bracket 2201 and the second shower bracket 1100 in a shower system, the first end 230*a* of the first shelf 230 is received by the first recess 2221 of the first shower bracket 2201 and the second end 230*b* of the first shelf 230 is received by the first recess 1121 of the second shower bracket 1100. The first end 250*a* of the first cylindrical rod 250 is received within the second recess 2230 of the first shower bracket 2201 and the second end 250*b* of the first cylindrical rod 250 is received by the c-shaped arcuate 1130 of the second shower bracket 900. The first end 260*a* of the second cylindrical rod 260 is received within the third recess 2232 of the first shower bracket 2201 and the second end 260*b* of the second cylindrical rod 260 is received within the u-shaped arcuate 1140 of the second shower bracket 900.

Because one of the shower brackets 2201 contains second and third recesses 2230, 2232 and the other bracket 100, 400, 900, 1100 have a slot in which the end of a cylindrical rod can pass through, both telescoping and rigid rods can be used as either or both of the cylindrical rods 250, 260.

The shower brackets 100, 400, 900, 1100, 2200 may be created by injection molding or an extrusion process. The shower bracket 100, 400, 900, 1100, 2200 may be machined, forged, molded, formed or otherwise manufactured from plastic, metal, wood or other materials or combinations of materials.

In an embodiment, the shelves 230, 240 may be a wet shelf made of wireframe material for the shelf to allow water to drain into the tub or shower stall. The wireframe may be of perforated stainless steel, aluminum or other such material. The wet shelf must be stiff enough to span the distance between mounting brackets and support the applied loads without collapsing or otherwise deforming. It is also desirable to have a backstop to prevent articles from falling out off the shelf towards the dry shower floor. A short front lip aids in stiffening the front of the wet shelf and prevent items from falling into the tub or shower stall without hampering user accessibility. For these reasons the preferred cross-sectional shape of the wet shelf made of a drainable light-weight wireframe is that of a "J" shape or L-shaped with a lip.

The shape of the wet shelf allows for use of readily available wireframe closet shelving modified to provide a back stop and to provide the rigidity necessary to bridge between the shower brackets of the shower systems. The standard wire shelving can be cut without concern of wire spacing. The lip that is standard on the stock wire shelving is designed to extend downward in the typical installation. The lip faces upward and forms the short front stop on the wet shelf.

It is also preferable to position the wet shelf such that the wet shelf is completely located on the bath, or shower side, of the curtain rod to allow for wet articles to shed water without wetting the floor outside the tub or shower stall. The shower system may include an additional drop shelf 801, as shown in FIG. 8, attached, or otherwise integrated into the shower system, to the cylindrical rods 250, 260 or shelves 230, 240.

The shelves 230, 240 may be a dry shelf. The dry shelf must be rigid enough to span the distance between the shower brackets and support the weight of articles placed upon the dry shelf. The dry shelf may be desirable for aesthetics as well as concealing the appearance of the wireframe wet shelf and curtain hangers.

In an embodiment, the shelves 230, 240 may be a single structure with an integral separating wall. One side of the wall may be a wet shelf as described above, while the other side of the structure may be a dry shelf as described above. In this embodiment, the shelf structures may be canted, with a short front lip, or flat without a lip.

In another embodiment, shower system 200, 500, and 1000 can be comprised of shelves 230, 240, being back-to-back. The interface between the back of the shelves 230, 240 is the boundary between the wet environment inside the shower tub, and the dry environment, opposite the wet environment. In this embodiment, the wet and dry environments are separated by a vapor barrier (not shown) that is attached to a cylindrical rod 250, 260 located below the shelves 230, 240. In an example, shelf 230, facing the wet environment, is perforated to allow moisture from one or more items located on the shelves 230, 240, to drain into the wet environment without affecting the dry environment.

The shower bracket 100, 400, 900, 1100, 2200 of the shower systems, space the various components to allow for clearance around the cylindrical rods 250, 260 to allow curtain hangers to slide without interference. In an embodiment, cylindrical rod 250 is shower curtain bar and cylindrical rod 260 is a towel bar. The towel bar must also have adequate clearance to allow for the user to push a towel through the towel bar by hand.

The shower bracket 100, 400, 900, 1100 of the shower systems, restrict movement of the supported cylindrical rods 250, 260 or shelves 230, 240 except for upward movement. Gravity and friction maintain the components of the shower systems in the desired positions of the slots or recesses of the shower brackets 100, 400, 900, 1100. No fasteners are used to restrain the cylindrical rods 250, 260 and shelves 230, 240, allowing for ease of assembly, disassembly for cleaning, or replacement etc.

The cylindrical rods 250, 260 and shelves 230, 240 are each independent of other cylindrical rods 250, 260 and shelves 230, 240. The cylindrical rods 250, 260 and shelves 230, 240 are fully supported by the shower brackets 100, 400, 900, 1100, 2200 of the shower systems. A user may utilize a plurality of cylindrical rods 250, 260 and a plurality of shelves 230, 240 mounted on the shower brackets 100, 400, 900, 1100 of the shower systems, or eliminate any of the aforementioned cylindrical rods 250, 260 or shelves 230, 240 without impacting the performance of the remaining cylindrical 250, 260 rods or shelves 230, 240.

The recesses, 21, 23, 921, 923, 1121 or u-shaped slots 27, 29, 427, 429, the first rounded aperture 965, the second rounded aperture 970, c-shaped arcuate 1130, j-shaped arcuate 1150, and u-shaped arcuate 1140, in a shower bracket of an embodiment of the present invention, receiving shelves 230, 240 or cylindrical rods 250, 260, independently allow for insertion or removal of any shelves 230, 240 or cylindrical rod 250, 260 without needing to remove any other item. The independence, and independent manipulation, of the shelves 230, 240 and cylindrical rods 250, 260 is convenient for cleaning of an individual component or changing the curtain.

It is possible that the cylindrical rods 250, 260 will experience some inadvertent movements. To prevent dislodgement, the cylindrical rods 250, 260 may be retained via a simple spacer that would slip or snap into the u-shaped slots 27, 29, 427, 429, the first rounded aperture 965, the second rounded aperture 970, c-shaped arcuate 1130, j-shaped arcuate 1150, and u-shaped arcuate 1140 between the cylindrical rods 250, 260. Another retaining means would be a simple clip consisting of two tight slots that would snap over both cylindrical rods 250, 260 simultaneously and fixing the position of the cylindrical rods 250, 260 relative to the cylindrical rods 250, 260 once the cylindrical rods 250, 260 are received in the shower brackets 100, 400, 900, 1100. The clips may be installed or removed by pushing the clips on, or off, with a sufficient force, whereby the sufficiency of force is that force which is needed to connect, or disconnect, the clip to the cylindrical rods 250, 260. Additionally, the clips can be used with the second and third recesses 2230, 2232 of shower bracket 2200.

Figure 19:
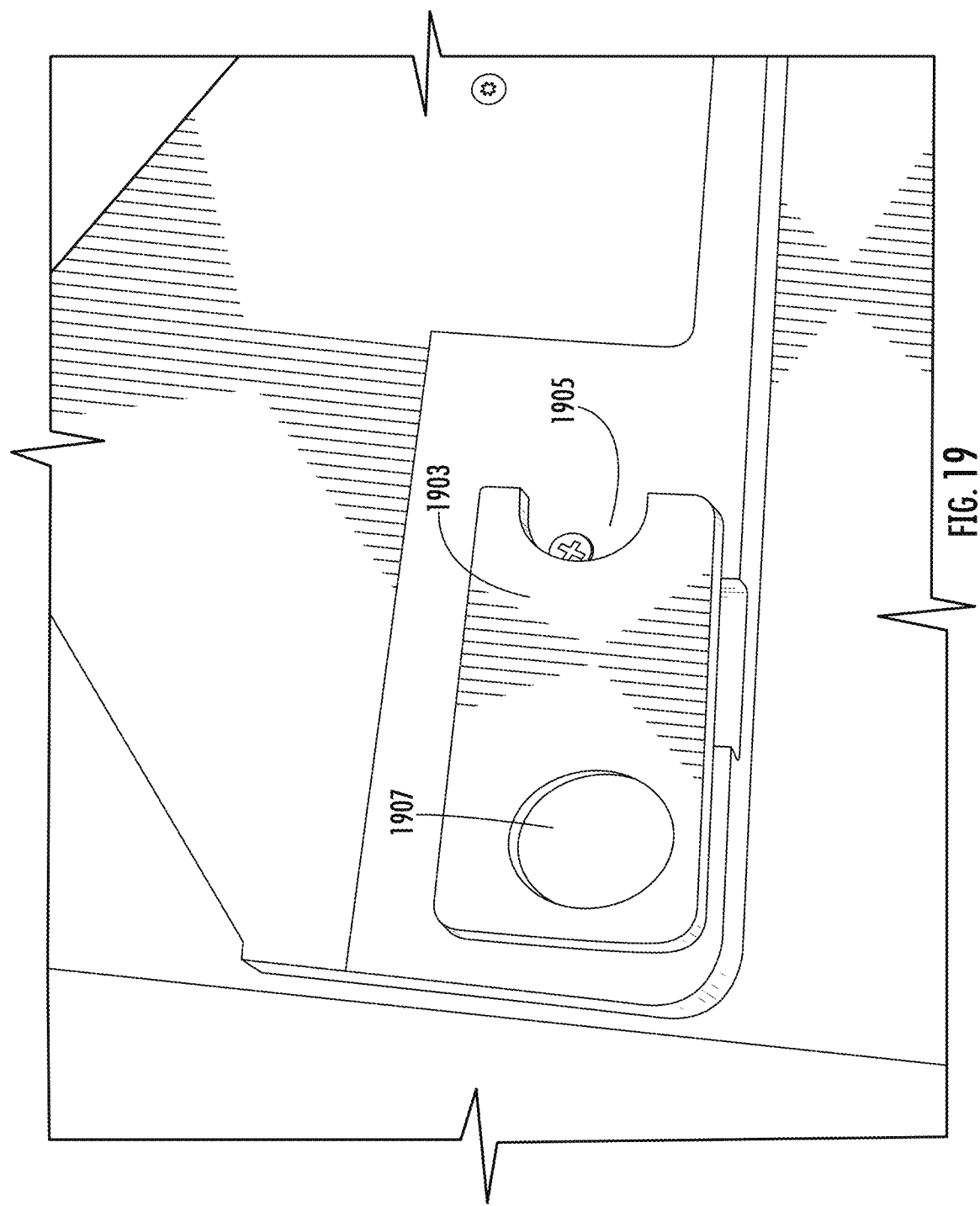
FIG. 19 shows a perspective view of the shower bracket having a first embodiment of a rod retention clip.
Figure 20:
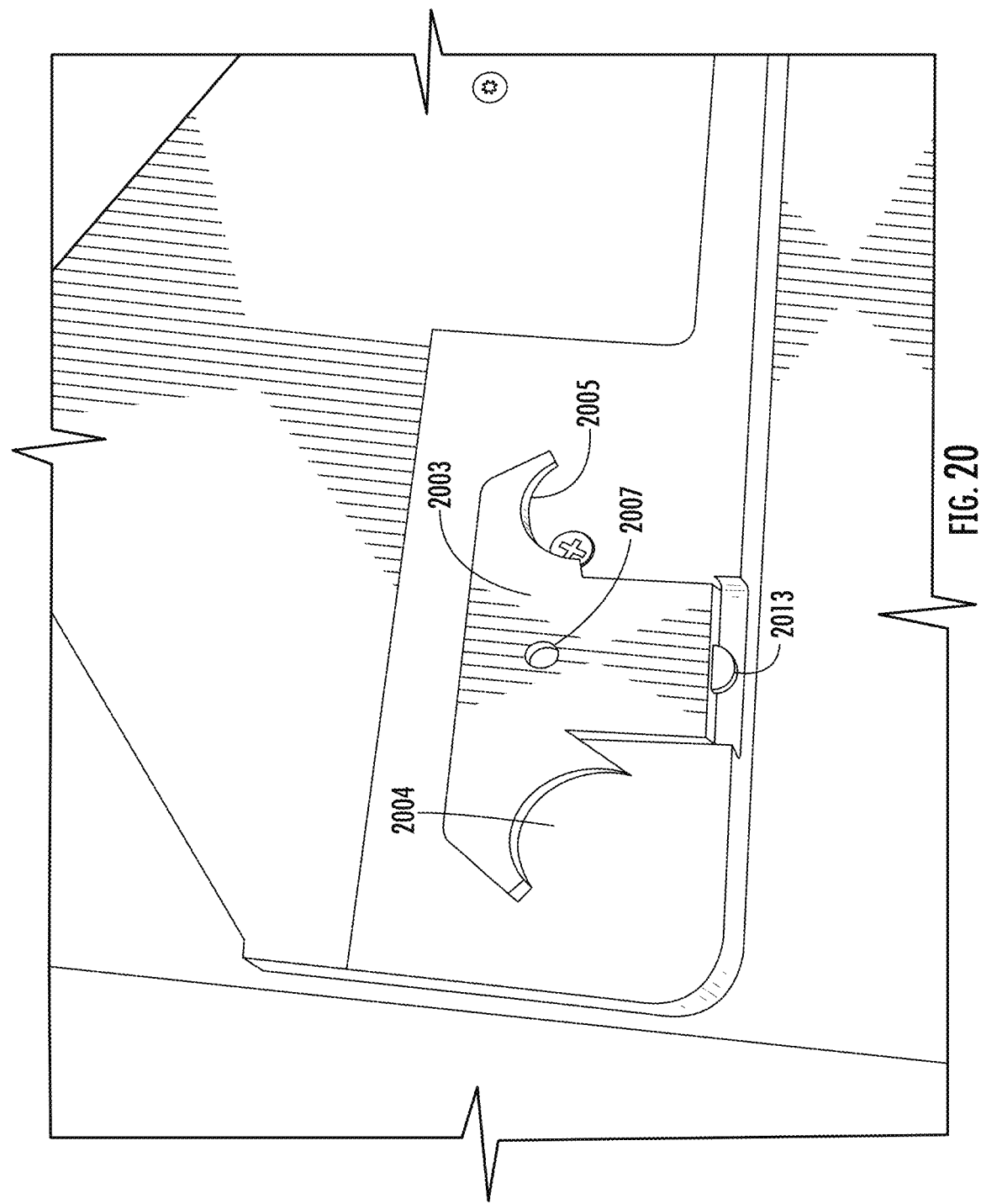
FIG. 20 shows a perspective view of the shower bracket having a second embodiment of a rod retention clip.
Figure 21:
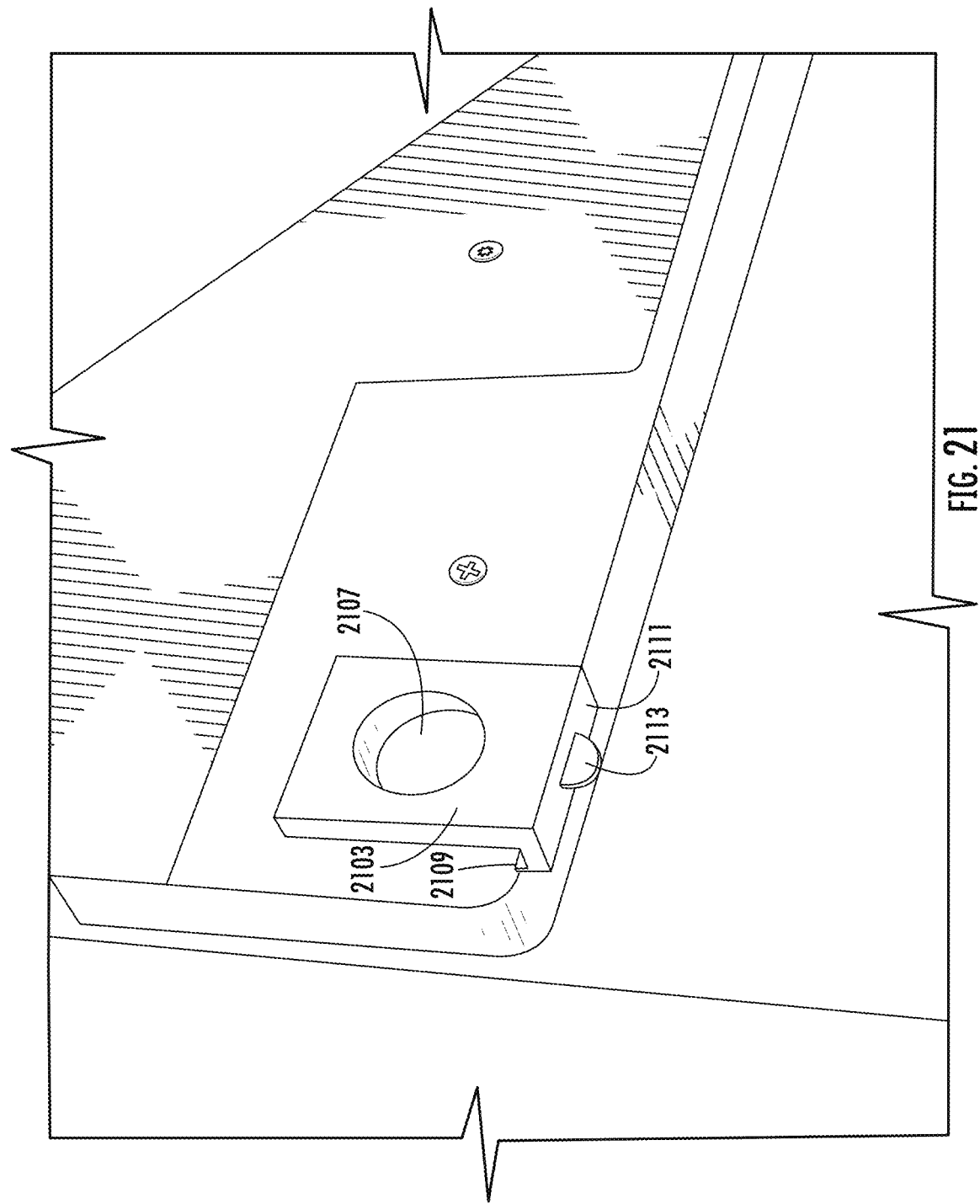
FIG. 21 shows a perspective view of the shower bracket having a third embodiment of a rod retention clip.

FIGS. 19-21 show multiple embodiments of a clip 1903, 2003, and 2103, that prevents the cylindrical rods 250, 260 from experiencing movement and dislodgement. The clips 1903, 2003, 2103 are preferably made of a rigid material.

In an embodiment shown in FIG. 19, the clip 1903 has a round hole 1907 at one end and a slot 1905 at the other end of the clip 1903. The clip 1903, through round hole 1907, receives the first end of cylindrical rod 250 and a snap action slot 1905 on the other end of clip 1903 receives the first end of cylindrical rod 260. The cylindrical rods 250, 260 are also secured at the second end by another clip 1903, 2003, or 2103. The clip 1903 simultaneously secures both cylindrical rod 250 and 260 and prevents movement of the rods in the shower bracket 900.

In another embodiment shown in FIG. 20, the clip 2003 is T-shaped with a first rounded surface aligned 2004 with the first aperture 965 and a second rounded surface 2005 aligned with the second aperture 970, below the horizontal portion of the "T". The vertical portion of the "T" is received within the channel 990. The clip 2003 additionally has an optional bore 2007 to receive a fastener to mount the clip 2003 to channel 990. A tab 2013 is used to dislodge the clip 2003 from the channel 990 of the shower bracket 900. The clip 2003 provides a slidable means of affixing a retainer to the cylindrical rods 250, 260 to prevent movement or dislodgement.

In another embodiment shown in FIG. 21, the clip 2103 has a hole 2107 which is slidably received by the ends of the cylindrical rods 250, 260 and is then snapped onto the shower bracket 900 via lip hook 2109. The lip hook 2109 of clip 2103 connects the clip 2103 to the shower bracket 900 by the lip 2111 engaging the first aperture 965 and channel 990, or the second aperture 970 and the channel 990. Clip 2103 may have a tab 2113 that a user may apply a pulling or pushing force to help dislodge the clip 2103 from shower bracket 900.

Although the present invention has been described in considerable detail with reference to certain preferred versions thereof, other versions are possible. For example, the shower brackets 100, 400, 900, 1100 can be sized to contain four, five, or six u-shaped slots for cylindrical rods 250, 260 beyond the embodiments discussed in the specification. Additionally recesses can be added to the shower bracket 2200. Similarly, multiple grooves beyond 21, 23, 921, 923, and 1121 may be created through the addition of shoulders similar to retaining shoulders 35 and 37. The additional shoulders, similar to retaining shoulders 35 and 37 may be added into the radially extending divider walls 19, 919 such that the bracket 100 can support a plurality of shelves. Therefore, the spirit and scope of the appended claims should not be limited to the description of the preferred versions contained herein. In another example, shower brackets 100, 400, 900, 1100, 2200 are interchangeable such that the shower system 200, 500, and 1000 can be comprised of shower brackets that are not mirror images. The first side of a wall may be shower bracket 100 while the opposite side of the wall may be shower bracket 100, 400, 900, 1000, or 2200.

The shower system may be installed in any shower stall, bathtub or shower opening containing at least two walls. In a first step, a shower bracket of any of the above discussed embodiments is fastened to the two walls opposite each other, such that at least the first recess in each of the shower brackets is aligned or the first recess of the first shower bracket is aligned with the first and second channels. Next, a first end of a first shelf is received by the first recess or the first and second channels of the first bracket and the second end of the shelf is received by the first recess or the first and second channels of the second bracket. Then, a first end of the first cylindrical rod is received by the first bracket. If the first bracket has a slot, the first end of the cylindrical rod is received within the slot and then seats in the aperture. If the first bracket has a recess, the first end of the cylindrical rod receives the first end. A second end of the first cylindrical rod is received by the recess or apertures of the second shower bracket. The steps associated with the first cylindrical rod was repeated for the second cylindrical rod. Optionally a clip can be inserted after any of the ends of the cylindrical rods are received by the apertures or recesses. Another shelf can optionally be received by first and second brackets.

What is claimed is:

1. A shower bracket comprising:
   a plate having a front face, a back face, and shaped to have an outer perimeter with a bottom surface, a first side surface at a first end, perpendicular to the bottom surface, a second side surface at a second end opposite the first side surface perpendicular to the bottom surface, and a top surface connected to the first side surface and the second side surface;
   a sectioner mounted to the front face of the plate having:
      a bottom wall aligned with the bottom surface of the plate connected to a first side wall aligned with the first side surface, a second side wall connected to the bottom wall aligned with the second side surface, a radially extended divider wall extending from the bottom wall to the top surface of the plate, and a horizontal wall perpendicular to the radially extending dividing wall, wherein the bottom wall extends longitudinally from the first end to a channel and from the channel to the second end of the plate;
   a first recess defined by the front face of the plate, the bottom wall of the sectioner, the first side wall of the sectioner and the radially extending divider wall;
   a second recess defined by the front face of the plate, the horizontal wall, and the second side wall of the sectioner;
   a third recess defined by the channel, the second side wall of the sectioner, the radially extending divider wall, and a bottom surface of the horizontal wall;
   a first rounded aperture defined by the radially extending divider wall, the bottom surface of the horizontal wall, and the channel; and
   a second rounded aperture defined by the second side wall of the sectioner, the bottom surface of the horizontal wall, and the channel.

2. A shower system for mounting to a first wall and a second wall comprising:
   a first shower bracket mounted to a wall by a fastener;
   a second shower bracket for mounting to the second wall opposite the first shower bracket,
   each of the first and second shower brackets comprising:
      a plate having a front face, a back face, and shaped to have an outer perimeter with a bottom surface, a first side surface at a first end, perpendicular to the bottom surface, a second side surface at a second end opposite the first side surface perpendicular to the bottom surface, and a top surface connected to the first side surface and the second side surface;
      a sectioner mounted to the front face of the plate having: a bottom wall, aligned with the bottom surface of the plate connected to a first side wall aligned with the first side surface, a second side wall connected to the bottom wall aligned with the second side surface, a radially extended divider wall extending from the bottom wall to the top surface of the plate, and a horizontal wall perpendicular to the radially extending dividing wall, wherein the bottom wall extends longitudinally from the first end to a channel and from the channel to the second end of the plate;
      a first recess defined by the front face of the plate, the bottom wall of the sectioner, the first side wall of the sectioner and the radially extending divider wall;

a second recess defined by the front face of the plate, the horizontal wall, and the second side wall of the sectioner;

a third recess defined by the channel, the second side wall of the sectioner, the radially extending divider wall, and a bottom surface of the horizontal wall;

a first rounded aperture defined by the radially extending divider wall, the bottom surface of the horizontal wall, and the channel;

a second rounded aperture defined by the second side wall of the sectioner, the bottom surface of the horizontal wall, and the channel;

a first shelf longitudinally extending from a first end to a second end, the first end received by first recess of the first shower bracket, the second end received by the first recess of the second shower bracket;

a second shelf longitudinally extending from a first end to a second end, the first end received by the second recess of the first shower bracket, the second end received by the second recess of the second shower bracket;

a first cylindrical rod longitudinally extending from a first end to a second end, the first end received by the first aperture of the first shower bracket and the second end received by the first aperture of the second shower bracket; and a second cylindrical rod longitudinally extending from a first end to a second end, the first end received by the second aperture of the first shower bracket and the second end received by the second aperture of the second shower bracket.

3. The shower system of claim 2, wherein the first end and the second end of the first cylindrical rod are received through the channel prior to being received by the first aperture; and the first end and the second end of the second cylindrical rod are received through the channel prior to being received by the second aperture.

4. The shower system of claim 2, wherein the first end and second end of the first cylindrical rod are independently removable from the first rounded aperture.

5. The shower system of claim 2, wherein the first end and second end of the second cylindrical rod are independently removable from the second rounded aperture.

6. The shower system of claim 2, wherein the first end and second end of the first shelf are independently removable from the first recess.

7. The shower system of claim 2, wherein the first end and second end of the second shelf are independently removable from the second recess.

8. The shower system of claim 2, further comprising at least one drop shelf attached to the first end of the first shelf.

9. The shower system of claim 3, wherein the first and second ends of the first and second cylindrical rods are upwardly received through the channel.

10. The shower system of claim 2, wherein the first cylindrical rod and the second cylindrical rod are secured into the apertures by a retaining clip selected from a group consisting of: a retaining clip having a round hole, a snap action slot, an open tapered snap-on slot, and a plug slot.

11. A shower bracket comprising:

a plate having a front face, a back face, and shaped to have an outer perimeter with a bottom surface, a first side surface at a first end, perpendicular to the bottom surface, a second side surface at a second end opposite the first side surface, perpendicular to the bottom surface, and a top surface connected to the first side surface and the second side surface;

a sectioner mounted to the front face of the plate having:

a bottom wall aligned with the bottom surface of the plate connected to a first side wall aligned with the first side surface, a second side wall connected to the bottom wall aligned with the second side surface, a radially extending wall extending from the bottom wall to the top surface of the plate, and a first recess defined by the front face of the plate, the bottom wall of the sectioner, the first side wall of the sectioner and the radially extending wall;

a second recess defined by the front face of the plate; and a third recess defined by the front face of the plate spaced apart a distance from the second recess.

12. A shower system for mounting to a first wall and a second wall comprising:

a first shower bracket mounted to a wall by a fastener;

a second shower bracket for mounting to the second wall opposite the first shower bracket, the first shower bracket comprising:

a plate having a front face, a back face, and shaped to have an outer perimeter with a bottom surface, a first side surface at a first end, perpendicular to the bottom surface, a second side surface at a second end opposite the first side surface, perpendicular to the bottom surface, and a top surface connected to the first side surface and the second side surface;

a sectioner mounted to the front face of the plate having:

a bottom wall aligned with the bottom surface of the plate connected to a first side wall aligned with the first side surface, a second side wall connected to the bottom wall aligned with the second side surface, a radially extending wall extending from the bottom wall to the top surface of the plate, and a first recess defined by the front face of the plate, the bottom wall of the sectioner, the first side wall of the sectioner and the radially extending wall;

a second recess defined by the front face of the plate; and a third recess defined by the front face of the plate spaced apart a distance from the second recess;

at least a first shelf longitudinally extending from a first end to a second end, the first end received by first recess of the first shower bracket, the second end received by the first recess of the second shower bracket;

a first cylindrical rod longitudinally extending from a first end to a second end, the first end received by the second recess of the first shower bracket and the second end received by the second shower bracket; and a second cylindrical rod longitudinally extending from a first end to a second end, the first end received by the third recess of the first shower bracket and the second end received by the second shower bracket.

13. The shower system of claim 12, wherein the second shower bracket comprises:

a plate having a front face, a back face, and shaped to have an outer perimeter with a bottom surface, a first side surface at a first end, perpendicular to the bottom surface, a second side surface at a second end opposite the first side surface, perpendicular to the bottom surface, and a top surface connected to the first side surface and the second side surface;

a sectioner mounted to the front face of the plate having:

a bottom wall aligned with the bottom surface of the plate connected to a first side wall aligned with the first side surface, a second side wall connected to the bottom wall aligned with the second side surface, a radially extending wall extending from the bottom wall to the top surface of the plate, and a first recess defined by the front face of the plate, the bottom wall of the sectioner, the first side wall of the sectioner and the radially extending wall;

a second recess defined by the front face of the plate; and a third recess defined by the front face of the plate spaced apart a distance from the second recess;

wherein the second end of the shelf is received within the first recess of the second shower bracket, the second end of the first cylindrical rod is received within the second recess of the second shower bracket, and the second end of the second cylindrical rod is received by the third recess of the second shower bracket.

14. The shower system of claim 13, wherein the first cylindrical rod and the second cylindrical rod are rigid rods.

15. The shower system of claim 13, wherein the first cylindrical rod and the second cylindrical rod are telescoping rods.

16. The shower system of claim 12, further comprising a second shelf longitudinally extending from a first end to a second end, the first end received by the second recess of the first shower bracket, the second end received by the second shower bracket.

17. The shower system of claim 12, wherein the second shower bracket comprises:

a plate having a front face, a back face, and shaped to have an outer perimeter with a bottom surface, a first side surface at a first end, perpendicular to the bottom surface, a second side surface at a second end opposite the first side surface, perpendicular to the bottom surface, and a top surface connected to the first side surface and the second side surface;

a sectioner mounted to the front face of the plate having:
a bottom wall aligned with the bottom surface of the plate connected to a first side wall aligned with the first side surface, a second side wall connected to the bottom wall aligned with the second side surface, a radially extending divider wall extending from the bottom wall to the top surface of the plate, and a truncated divider wall extending from the bottom wall parallel to the radially extending divider wall, wherein the bottom wall extends longitudinally from the first end to the second end of the plate;

a first recess defined by the front face of the plate, the bottom wall of the sectioner, the first side wall of the sectioner and the radially extending divider wall;

a second recess defined by the front face of the plate, the bottom wall of the sectioner, the second side wall, the radially extending divider wall, the truncated divider wall, a first retaining shoulder perpendicular to and projecting from the radially extending divider wall, proximate to a first u-shaped slot, and a second retaining shoulder perpendicular to and projecting from the second side wall and aligned with the first retaining shoulder, proximate to a second u-shaped slot;

the first u-shaped slot defined by the radially extending divider wall and the truncated divider wall; and the second u-shaped slot defined by the second wall of the sectioner and the truncated divider wall;

wherein the second end of the first cylindrical rod is received by the second recess and seats in the first u-shaped slot of the second shower bracket and the second end of the second cylindrical rod is received by the second recess and seats in the second u-shaped slot of the second shower bracket.

18. The shower system of claim 17, wherein the first end of the first cylindrical rod is independently removable from the second recess and the second end of the first cylindrical rod is independently removable from the first u-shaped slot.

19. The shower system of claim 17, wherein the first end of the second cylindrical rod is independently removable from the third recess and the second end of the first cylindrical rod is independently removable from the second u-shaped slot.

20. The shower system of claim 17, wherein the first end and second end of the first shelf are independently removable from the first recess.

21. The shower system of claim 17, further comprising at least one drop shelf attached to the first shelf.

22. The shower system of claim 12, wherein the second shower bracket comprises:

a plate having a front face, a back face, and shaped to have an outer perimeter with a bottom surface, a first side surface at a first end, perpendicular to the bottom surface, a second side surface at a second end opposite the first side surface perpendicular to the bottom surface, and a top surface connected to the first side surface and the second side surface;

a sectioner mounted to the front face of the plate having:
a bottom wall, aligned with the bottom surface of the plate connected to a first side wall aligned with the first side surface, a second side wall connected to the bottom wall aligned with the second side surface, a radially extended divider wall extending from the bottom wall to the top surface of the plate, and a horizontal wall perpendicular to the radially extending dividing wall, wherein the bottom wall extends longitudinally from the first end to a channel and from the channel to the second end of the plate;

a first recess defined by the front face of the plate, the bottom wall of the sectioner, the first side wall of the sectioner and the radially extending divider wall;

a second recess defined by the front face of the plate, the horizontal wall, and the second side wall of the sectioner;

a third recess defined by the channel, the second side wall of the sectioner, the radially extending divider wall, and a bottom surface of the horizontal wall;

a first rounded aperture defined by the radially extending divider wall, the bottom surface of the horizontal wall, and the channel;

a second rounded aperture defined by the second side wall of the sectioner, the bottom surface of the horizontal wall, and the channel;

wherein the second end of the first cylindrical rod is received by first aperture of the second shower bracket and the second end of the second cylindrical rod is received by the second aperture of the second shower bracket.

23. The shower system of claim 22, wherein the second end of the first cylindrical rod is received through the channel prior to being received by the first aperture and the second end of the second cylindrical rod is received through the channel prior to being received by the second aperture.

24. The shower system of claim 22, wherein the first end of the first cylindrical rod is independently removable from the second recess and the second end of the first cylindrical rod is independently removable from the first rounded aperture.

25. The shower system of claim 22, wherein the first end of the second cylindrical rod is independently removable from the third recess and the second end of the first cylindrical rod is independently removable from the second rounded aperture.

26. The shower system of claim 22, wherein the first end and second end of the first shelf are independently removable from the first recess.

27. The shower system of claim 22, further comprising at least one drop shelf attached to the first shelf.

\* \* \* \* \*